(12) United States Patent
Benisty

(10) Patent No.: US 11,119,954 B2
(45) Date of Patent: Sep. 14, 2021

(54) HOST EMULATOR

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

(*) Notice: Subject to any disclaimer, the term of this patent is extended or adjusted under 35 U.S.C. 154(b) by 214 days.

(21) Appl. No.: 16/449,799

(22) Filed: Jun. 24, 2019

(65) Prior Publication Data

US 2020/0097422 A1 Mar. 26, 2020

Related U.S. Application Data

(60) Provisional application No. 62/736,192, filed on Sep. 25, 2018.

(51) Int. Cl.
*G06F 12/00* (2006.01)
*G06F 13/16* (2006.01)
*G06F 3/06* (2006.01)

(52) U.S. Cl.
CPC ........ *G06F 13/1694* (2013.01); *G06F 3/0614* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 9,703,631 | B2 | 7/2017 | Earhart |
| 9,823,849 | B2 | 11/2017 | Schmisseur et al. |
| 2009/0083021 | A1 | 3/2009 | Gan et al. |
| 2015/0234746 | A1* | 8/2015 | Jo ........................ G06F 12/0246 711/103 |
| 2015/0319237 | A1 | 11/2015 | Hussain et al. |
| 2019/0180831 | A1* | 6/2019 | Shukla ............... G11C 16/3459 |

OTHER PUBLICATIONS

NVM Express, "NVM Express," Rev. 1.3a, Oct. 24, 2017, 287 pages.

* cited by examiner

*Primary Examiner* — Daniel D Tsui

(74) *Attorney, Agent, or Firm* — Vierra Magen Marcus LLP

(57) ABSTRACT

Technology is described herein that provides a memory device configured to receive first memory access requests from a host system on a host connection while the non-volatile memory device is in a first mode. The first memory access requests to allow the host system to access the non-volatile memory cells in accordance with a memory access protocol. The memory device is configured to initiate second memory access requests internally in accordance with the memory access protocol while the non-volatile memory device is in a second mode. The memory device is configured to implement a memory controller side of the memory access protocol to respond to the first memory access requests while the non-volatile memory device is in the first mode and to respond to the second memory access requests while the non-volatile memory device is in the second mode.

18 Claims, 17 Drawing Sheets

HOST EMULATOR

PRIORITY CLAIM

The application claims priority to Provisional Application 62/736,192 filed on Sep. 25, 2018, titled "Low-Cost and Generic Embedded Host Emulator," incorporated herein by reference in its entirety.

BACKGROUND

The present disclosure relates to technology for non-volatile storage.

One type of non-volatile storage is semiconductor memory. For example, non-volatile semiconductor memory is used in solid state drives, mobile computing devices, non-mobile computing devices and other non-volatile memory devices. Typically, a non-volatile memory device has a memory controller which controls access of a host system to non-volatile storage (also referred to as non-volatile memory) in the non-volatile memory device. The host system could be computer system, cellular telephone, server, etc.

The host system and memory controller typically communicate using a logical device interface, which may also be referred to herein as a "memory access protocol." For example, NVMe (Non-Volatile Memory Express) is a logical device interface that may be used to access non-volatile storage when using a PCIe (Peripheral Computer Interconnect Express) bus between the host system and the non-volatile memory device. There are many other logical device interfaces that can be used between a host system and non-volatile memory device.

DETAILED DESCRIPTION

Figure 1A:
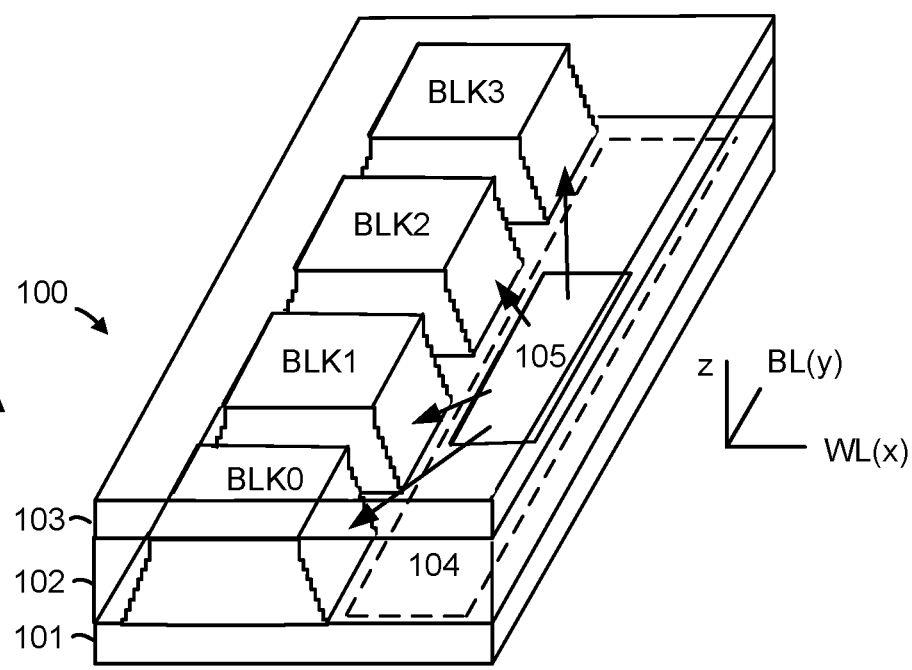
FIG. 1A is a perspective view of a set of blocks in a 3D stacked non-volatile memory device.

Technology is described herein that provides a non-volatile memory device (or more briefly "memory device") that has a first mode in which memory access requests are received from a host system external to the memory device, and a second mode in which memory access request are initiated internally within the memory device. The first mode is referred to as a functional mode and the second mode is referred to as a host emulator mode, in one embodiment. The first mode may be used to allow a host system (that is external to the memory device) to access non-volatile memory within the memory device. The second mode may be used to test the memory device. The second mode allows the memory device to be tested without the need to provide memory access requests from external to the memory device.

The non-volatile memory device has a non-volatile memory controller and non-volatile storage (e.g., NAND, NOR, ReRAM, phase change memory (PCM), etc.). The non-volatile memory controller may implement a "logical device interface," which may also be referred to herein as a "memory access protocol." The non-volatile memory controller may use the memory access protocol to communicate with a host system, which implements a host side of the memory access protocol. One example of a memory access protocol is the Non-Volatile Memory Express (NVMe) protocol. NVMe is a logical device interface (or memory access protocol) that may be used to access non-volatile storage attached when using a Peripheral Component Interconnect Express (PCIe) bus between the host system and the non-volatile memory device. However, note that the logical device interface is not limited to NVMe. Other possible logical device interfaces include, but are not limited to, Advanced Host Computer Interface (AHCI), Serial Advanced Technology Attachment (SATA), MultiMediaCard (MMC), embedded MMC (eMMC), Universal Serial Bus (USB), Serial Attached Small Computer Systems Interface SCSI (or SAS), Fibre Channel Protocol (FCP), and Universal Flash Storage (UFS).

In some embodiments, the memory device has a host emulator that is used in the second mode. In the first mode, the host emulator is not used. Instead an external host controller is used to provide memory access commands to the memory device. The host emulator is configured to emulate the external host controller while the non-volatile memory controller is a host emulator mode, in one embodiment. To emulate the host controller means to reproduce a significant set of functions or actions of the host controller. It is not required that all functions or all actions of the host controller be reproduced. For example, the host emulator may initiate memory access commands internally to the host interface. The host emulator may also initialize the non-volatile memory controller by, for example, setting up I/O queues.

The host emulator may be used as an alternative to using a host system to communicate with the non-volatile memory controller via the memory access protocol. The host emulator may be used when a host system is not available to communicate with the non-volatile memory controller via the memory access protocol. The host emulator may be used to send commands, which would otherwise have been sent by the host system, to the host interface in the non-volatile memory controller (which implements the memory device side of the logical device interface). For example, the host emulator may send commands (e.g., read, write, erase) to access the non-volatile storage, which would otherwise be sent by a host controller in the host system. The host emulator may send these commands to the host interface in the non-volatile memory controller.

The host interface in the non-volatile memory controller may then process these commands. For example, the host interface may compose commands, which are sent to one or more memory dies in the memory device. The memory die(s) process the commands, and respond back to the host interface. The host interface then responds back to the host emulator. In one embodiment, the host emulator is used to test operation of the memory device.

During normal operation of the memory device, the host emulator is not used. Instead, the host system sends commands to the host interface in the non-volatile memory controller. Note that these commands may be sent over an interface, such as a PCIe interface. The interface between the memory device and host is not used when the host emulator is used, in one embodiment.

In some cases, the host system is not available when the memory system is to be tested. Also, even if the host system is available, working with a host system when testing the memory device can be messy, complex, expensive, and unstable. Also, testing with modern physical and logical device interfaces is challenging due to: extremely high speeds, serial interface, and complex physical connections. Host related interface issues include: connection issues, host platform issues, unavailability of new protocols, and early firmware being unable to handle all host scenarios.

Thus, as memory system become generally more complex to support high-speed serial interfaces such as SATA, PCIe, SAS, USB, UHS-II and UFS, there is a need for enhanced debug techniques and methods to detect anomalies in the memory system. Specifically, in some scenarios, the capability to isolate the host system from the storage device is essential. Having the ability of stressing all components such as NAND, internal processors and data-path in full rate, while not attaching a host system, simplifies the ramp up process, reduces cost and is extremely important for time to market.

Embodiments disclosed herein provide for better test methodology that are able to isolate the host system from the debug process, while stressing all components in the storage device with maximum performance. The host emulator avoids the need to attach a host system. Also, the host emulator allows full coverage of the data path along the logical device interface. The host emulator allows full coverage all hardware (HW) and firmware (FW) components without changing anything in the functional FW, in an embodiment. The FW and HW are not even aware that the device is working in the host emulator mode, in an embodiment. Embodiments of a host emulator can be used for FW development, ASIC validation, tester, collecting coverage, and exception standards.

In some scenarios, the host emulator can be used if a host system is available. This may be used to determine whether the host system itself is a root cause of a problem. Thus, the host emulator can remove the host system from the debug process to determine whether the host system itself is a root cause of a problem.

Technology described herein may be used with a variety of types of non-volatile memory. One example is a three-dimensional (3D) non-volatile memory device. However, embodiments may also be practiced in two-dimensional (2D) non-volatile memory device. FIG. 1A is a perspective view of a set of blocks in a 3D stacked non-volatile memory system 100. The non-volatile memory system 100 may also be referred to herein as a non-volatile memory system 100. The non-volatile memory system 100 includes a substrate 101. On the substrate are example blocks BLK0, BLK1, BLK2 and BLK3 of memory cells (storage elements) and a peripheral area 104 with circuitry for use by the blocks. For example, the circuitry can include voltage drivers 105 which can be connected to control gate layers of the blocks. In one approach, control gate layers at a common height in the blocks are commonly driven. The substrate 101 can also carry circuitry under the blocks, along with one or more lower metal layers which are patterned in conductive paths to carry signals of the circuitry. The blocks are formed in an intermediate region 102 of the memory device. In an upper region 103 of the memory system, one or more upper metal layers are patterned in conductive paths to carry signals of the circuitry. Each block comprises a stacked area of memory cells, where alternating levels of the stack represent control gate layers. In one possible approach, the control gate layers of each block at a common height are connected to one another and to a voltage driver. While four blocks are depicted as an example, two or more blocks can be used, extending in the x- and/or y-directions.

The length of the plane, in the x-direction, may represent a direction in which signal paths to word lines extend in the one or more upper metal layers (e.g., a word line or drain side select gate (SGD) line direction), and the width of the plane, in the y-direction, represents a direction in which signal paths to bit lines extend in the one or more upper metal layers (e.g., a bit line direction). The z-direction represents a height of the memory device.

Figure 1B:
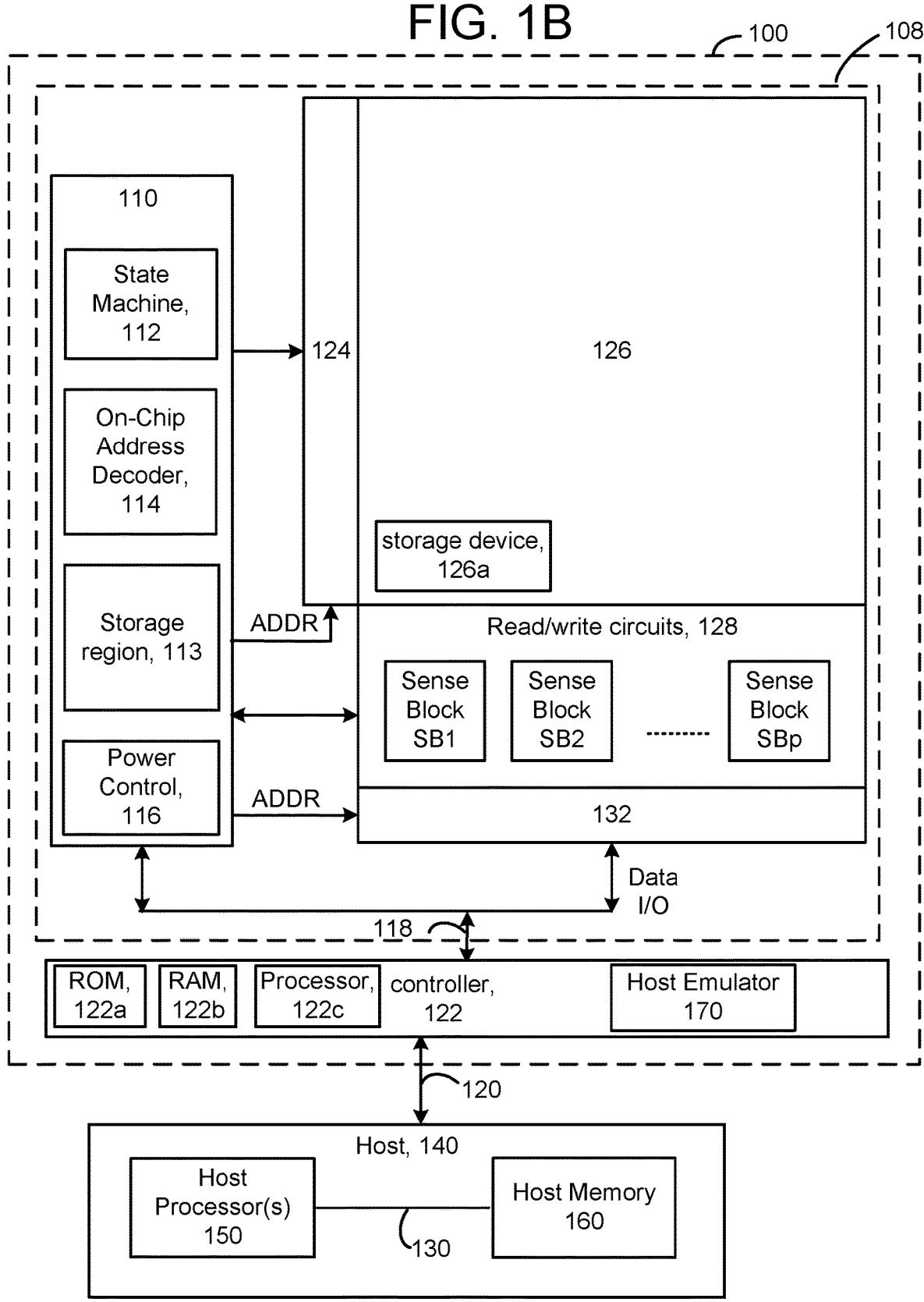
FIG. 1B is a functional block diagram of a memory device such as the 3D stacked non-volatile memory device of FIG. 1A, and a host system.

FIG. 1B is a functional block diagram of a non-volatile memory device such as the 3D stacked non-volatile memory system 100 of FIG. 1A, which is coupled to a host system. The functional block diagram may also be used for a 2D non-volatile memory device. Host system 140 has one or more host processors 150 and host memory 160. The one or more host processors 150 and host memory 160 may communicate over a bus 130. Host memory 160 may include, but is not limited to, Static Random Access Memory (SRAM) and Dynamic Random Access Memory (DRAM). Commands and data are transferred between the host system 140 and non-volatile memory controller 122 via an interface (e.g., data bus) 120 and between the memory controller and the one or more memory die 108 via lines 118. The interface 120 may also be referred to as an external communication interface. Note that "non-volatile memory controller" 122 may be referred to herein more succinctly as "memory controller" or "controller".

The host system 140 could be, but it not limited to, a smartphone, personal digital assistant (PDA), laptop computer, notebook computer, set top box, camera, or other electronic device. In one embodiment, the host system 140 and memory system 100 reside in an automobile, and the host controls the automobile's electronic system. Host memory 160 may store software applications to run on host processor(s) 150 to implement functionality of a smartphone, personal digital assistant (PDA), laptop computer, notebook computer, set top box, camera, automobile's electronic system controller, or other electronic device.

The interface 120 between the host system 140 and the memory system 100 may be any suitable interface. The interface 120 may include a mechanical and/or electrical connection between the host system 140 and memory system 100. The mechanical and/or electrical connection may comply with a variety of form factors. The interface 120 may include a protocol for transferring signals over the mechanical and/or electrical connection. Examples for the interface 120 include, but are not limited to, Secure Digital (SD), MultiMediaCard (MMC), embedded MultiMediaCard (eMMC), Universal Serial Bus (USB), Serial Advanced Technology Attachment (SATA), Fibre Channel, Small Computer Systems Interface (SCSI), Peripheral Component Interface (PCI), and PCI Express (PCIe). In one embodiment, the interface 120 includes a Peripheral Component Interconnect Express (PCIe) bus.

The memory system 100 and host system 140 communicate over the interface 120 using a logical device interface, which may also be referred to herein as a "memory access protocol." In one embodiment, the memory system 100 and host system 140 communicate over a PCIe bus based on a Non-Volatile Memory Express (NVMe) protocol. NVMe is a logical device interface that may be used to access non-volatile storage attached when using a PCIe bus between the host system 140 and the non-volatile memory system 100. However, note that the logical device interface is not limited to NVMe. Other possible logical device interfaces include, but are not limited to, Advanced Host Controller Interface (AHCI), SATA, SATA Express, MMC, eMMC, USB, Serial Attached SCSI (SAS), Fibre Channel Protocol (FCP), and Universal Flash Storage (UFS).

In one embodiment, the non-volatile memory system 100 may be a card based system, such as a secure digital (SD) or a micro secure digital (micro-SD) card. In an alternative embodiment, the non-volatile memory system 100 may be part of an embedded non-volatile memory device. For example, the non-volatile memory system 100 may be embedded within the host system 140, such as in the form of a solid state disk (SSD) drive installed in a personal computer. Herein, the host system 140 will be referred to as being external to the non-volatile memory system 100 even if the non-volatile memory system 100 is embedded within the host system 140. Also, non-transitory storage (e.g., host memory 160) in the host system 140 will be referred to as being external to memory system 100 whether or not the memory system 100 is embedded within the host system 140.

The non-volatile memory system 100 may include one or more memory die 108. The set of blocks of FIG. 1A can be on one memory die 108. The memory die 108 includes a memory structure 126 of memory cells (e.g., non-volatile memory cells), such as an array of memory cells, control circuitry 110, and read/write circuits 128. In a 3D configuration, the memory structure can include the blocks of FIG. 1A. The memory structure 126 is addressable by word lines via a row decoder 124 and by bit lines via a column decoder 132. The read/write circuits 128 include multiple sense blocks SB1, SB2, . . . , SBp (sensing circuitry) and allow a page of memory cells to be read or programmed in parallel. Typically, a memory controller 122 is included in the same non-volatile memory system 100 (e.g., a removable storage card) as the one or more memory die 108.

Multiple memory elements in memory structure 126 may be configured so that they are connected in series or so that each element is individually accessible. By way of non-limiting example, flash memory systems in a NAND configuration (NAND memory) typically contain memory elements connected in series. A NAND string is an example of a set of series-connected transistors comprising memory cells and select gate transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The memory structure 126 can be two-dimensional (2D) or three-dimensional (3D). The memory structure 126 may comprise one or more arrays of memory elements (also referred to as memory cells). In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

The memory structure may comprise a monolithic three-dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

One of skill in the art will recognize that this technology is not limited to the two dimensional and three dimensional exemplary structures described but covers all relevant memory structures within the spirit and scope of the technology as described herein and as understood by one of skill in the art.

The exact type of memory array architecture or memory cell included in memory structure 126 is not limited to the examples above. Many different types of memory array architectures or memory technologies can be used to form memory structure 126. No particular non-volatile memory technology is required for purposes of the new claimed embodiments proposed herein. Other examples of suitable technologies for memory cells of the memory structure 126 include ReRAM memories, magnetoresistive memory (e.g., MRAM, Spin Transfer Torque MRAM, Spin Orbit Torque MRAM), phase change memory (e.g., PCM), and the like. Examples of suitable technologies for memory cell architectures of the memory structure 126 include two dimensional arrays, three dimensional arrays, cross-point arrays, stacked two dimensional arrays, vertical bit line arrays, and the like.

The memory elements can be formed from passive and/or active elements, in any combination. By way of non-limiting example, passive semiconductor memory elements include ReRAM device elements, which in some embodiments include a resistivity switching storage element, such as an anti-fuse or phase change material, and optionally a steering element, such as a diode or transistor. The phase change material may include a chalcogenide material. Further by way of non-limiting example, active semiconductor memory elements include EEPROM and flash memory device elements, which in some embodiments include elements containing a charge storage region, such as a floating gate, conductive nanoparticles, or a charge storage dielectric material.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a memory controller for memory read-write operations may be located on a separate controller chip and/or on the same substrate as the memory elements.

The control circuitry 110 cooperates with the read/write circuits 128 to perform memory operations on the memory structure 126, and includes a state machine 112, an on-chip address decoder 114, and a power control module 116. The state machine 112 provides chip-level control of memory operations. A storage region 113 may be provided for parameters for operating the memory device such as programming parameters for different rows or other groups of memory cells. These programming parameters could include bit line voltages and verify voltages.

The on-chip address decoder 114 provides an address interface between that used by the host or a memory controller to the hardware address used by the decoders 124 and 132. The power control module 116 controls the power and voltages supplied to the word lines and bit lines during memory operations. It can include drivers for word line layers (WLLs) in a 3D configuration, SGS and SGD select gates and source lines. The sense blocks can include bit line drivers, in one approach. A source side select gate (SGS) is a gate transistor at a source-end of a NAND string, and a drain side select gate (SGD) is a transistor at a drain-end of a NAND string.

In some implementations, some of the components can be combined. In various designs, one or more of the components (alone or in combination), other than memory structure 126, can be thought of as one or more control circuits which are configured to perform the actions described herein. For example, one or more control circuits may include any one of, or a combination of, control circuitry 110, state machine 112, decoders 114/124/132, power control module 116, sense blocks SB1, SB2, . . . , SBp, read/write circuits 128, memory controller 122, processor 122c, host emulator 170, and so forth.

The memory controller 122 may comprise a processor 122c and storage devices (memory) such as read only memory (ROM) 122a, RAM 122b and host emulator 170. The host emulator 170 may be used to emulate operation of the host system 140. The host emulator 170 may be implemented in hardware, software, or a combination of hardware and software. For example, host emulator 170 may include an application specific integrated circuit (ASIC), a Field Programmable Gate Array (FPGA), state machine, a circuit, a digital logic circuit, an analog circuit, a combination of discrete circuits, gates, or any other type of hardware or combination thereof. Alternatively or in addition, host emulator 170 may include software stored in a processor readable device (e.g., ROM 122a, RAM 122b, storage device region 126a) to program a processor (e.g., processor 122c) for host emulator 170 to perform the functions described herein.

RAM 122b may be, but is not limited to, SRAM and DRAM. The storage devices comprise code such as a set of instructions, and the processor is operable to execute the set of instructions to provide the functionality described herein. Alternatively or additionally, the processor can access code from a storage device region 126a of the memory structure, such as a reserved area of memory cells in one or more word lines.

The code is used by the memory controller 122 to access the memory structure 126 such as for programming, read and erase operations. The code can include boot code and control code (e.g., a set of instructions). The boot code is software that initializes the memory controller during a booting or startup process and enables the memory controller to access the memory structure. The code can be used by the memory controller to control one or more memory structures. Upon being powered up, the processor 122c fetches the boot code from the ROM 122a or storage device region 126a for execution, and the boot code initializes the system components and loads the control code into the RAM 122b. Once the control code is loaded into the RAM 122b, it is executed by the processor 122c. The control code includes drivers to perform basic tasks such as controlling and allocating memory, prioritizing the processing of instructions, and controlling input and output ports.

Figure 2A:
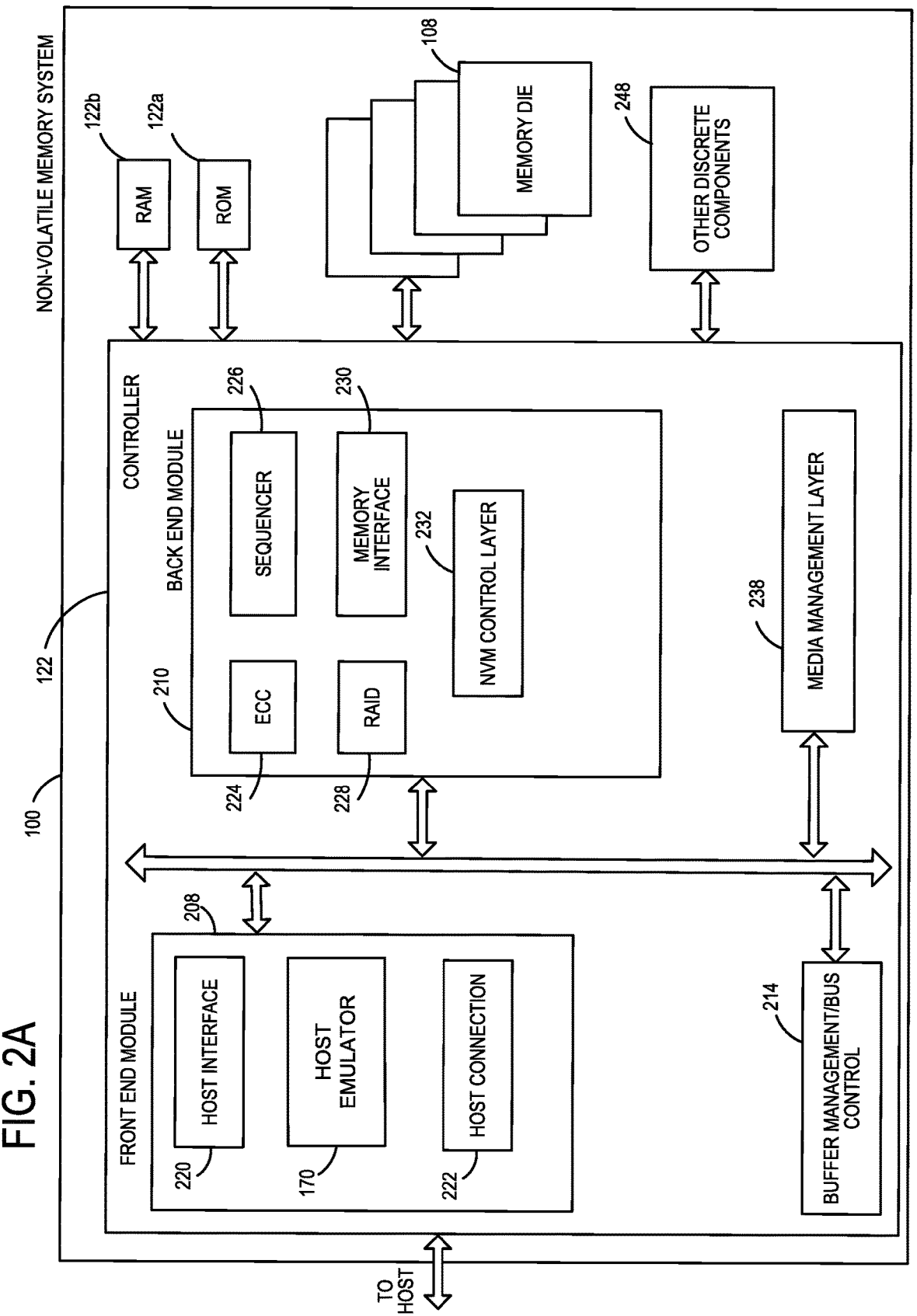
FIG. 2A is a block diagram of example memory system, depicting more details of one embodiment of memory controller.

FIG. 2A is a block diagram of example memory system 100, depicting more details of one embodiment of memory controller 122. As used herein, a memory controller is a device that manages data stored on memory and communicates with a host, such as a computer or electronic device. In one embodiment, the memory controller is a flash memory controller. However, the memory controller is not limited to flash memory controller. For example, the non-volatile memory in the memory die 108 may contain phase change memory. A memory controller can have various functionality in addition to the specific functionality described herein. For example, the memory controller can format the memory to ensure the memory is operating properly, map out bad memory cells, and allocate spare memory cells to be substituted for future failed cells. Some part of the spare cells can be used to hold firmware to operate the memory controller and implement other features. In operation, when a host needs to read data from or write data to the memory, it will communicate with the memory controller. If the host provides a logical address to which data is to be read/written, the memory controller can convert the logical address received from the host to a physical address in the flash memory. (Alternatively, the host can provide the physical address). The memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between memory controller 122 and non-volatile memory die 108 may be any suitable memory interface, such as Toggle Mode 200, 400, or 800 in a flash memory interface. In one embodiment, memory system 100 may be a card based system, such as a secure digital (SD) or a micro secure digital (micro-SD) card. In an alternate embodiment, memory system 100 may be part of an embedded memory system. For example, the memory may be embedded within the host. In other example, memory system 100 can be in the form of a solid state drive (SSD) drive.

In some embodiments, non-volatile memory system 100 includes a single channel between memory controller 122 and non-volatile memory die 108, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if a single channel is shown in the drawings.

As depicted in FIG. 2A, memory controller 122 includes a front end module 208 that interfaces with a host, a back end module 210 that interfaces with the one or more non-volatile memory die 108, and various other modules that perform functions which will now be described in detail. The memory controller 122 may be configured to implement a memory access protocol, such as an NVMe protocol.

Front end module 208 includes a host interface 220, a host connection 222, and a host emulator 170. In one embodiment, the host interface 220 implements the memory access protocol. For example, the host interface 220 may implement the memory controller side of an NVMe protocol. The host interface 220 has a command processor, in one embodiment. The command processor accesses commands that are provided by the host, parses the commands, and initiates execution of the commands. The commands may include I/O commands (e.g., read, write). The command processor communicates with the back end module 210 to execute the I/O commands. The choice of the type of host interface 220 can depend on the type of memory being used. Examples of host interfaces 220 include, but are not limited to, NVMe, Advanced Host Controller Interface (AHCI), SATA, SATA Express, MMC, eMMC, USB, Serial Attached SCSI (SAS), Fibre Channel Protocol (FCP), and Universal Flash Storage (UFS). The host interface 220 typically facilitates transfer for data, control signals, and timing signals.

The host emulator 170 has controller initializer, in one embodiment. The controller initializer handles initialization of the memory controller 122. The initialization process may establish values in various registers in the non-volatile memory system 100, as well as create Input/Output (I/O) queues. The I/O queues may include I/O command submission queues, on which the host places I/O commands, such as read and write commands. The I/O queues may include I/O command completion queues, on which the memory controller 122 places responses to the I/O commands that were placed on the I/O command submission queues. In one embodiment, during initialization, the host sends commands to the memory controller 122 that specify addresses of the I/O queues. The commands may also specify a mapping between I/O completion queues and I/O submission queues.

The host connection 222 provides the electrical interface with the host or next level storage controller. The physical layer interface 222 is responsible for the implementation of the physical, link and transport layers, in an embodiment. The host connection 222 is configured to control data transfer with the host system 140 at a physical level and a link level, in an embodiment. The physical layer includes a PHY and a MAC, in one embodiment. The PHY is responsible for the physical layer, and the MAC is responsible for the link and transport layers, in an embodiment. The host connection 222 includes non-transitory storage that may be used to implement one or more of the physical, link and transport layers, in one embodiment. The non-transitory storage may be volatile or non-volatile memory. In one embodiment, the host interface 220 communicates with the host connection 222 using a dedicated bus (such as an AXI bus). Using this bus, the host interface 220 sends read/write transactions to the host connection 222 which are finally directed to the Host.

Embodiments provide a solution having a comprehensive low cost host emulator module in the host interface block adjacent to the host connection 222. The host emulator 170 may be used to emulate operation of at least a portion of the host system 140. The host emulator 170 may be used to emulate operation of a host side of a memory access protocol. The host emulator 170 communicates with the host interface 220, in one embodiment. The host connection 222 is not used in one embodiment when the host emulator 170 is used.

The components of memory controller 122 depicted in FIG. 2A may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include software stored in a processor readable device (e.g., memory) to program a processor for memory controller 122 to perform the functions described herein.

Referring again to modules of the memory controller 122, a buffer manager/bus control 214 manages buffers in random access memory (RAM) 122b and controls the internal bus arbitration of memory controller 122. A read only memory (ROM) 122a stores system boot code. Although illustrated in FIG. 2A as located separately from the memory controller 122, in other embodiments one or both of the RAM 122b and ROM 122a may be located within the controller. In yet other embodiments, portions of RAM and ROM may be located both within the memory controller 122 and outside the controller. Further, in some implementations, the memory controller 122, RAM 122b, and ROM 122a may be located on separate semiconductor die.

Back end module 210 includes an error correction code (ECC) engine 224 that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A non-volatile memory (NVM) control layer 232 controls the overall operation of back end module 210. In one embodiment, NVM control layer 232 is a flash control layer.

Additional components of system 100 illustrated in FIG. 2A include media management layer 238, which performs wear leveling of memory cells of non-volatile memory die 108. System 100 also includes other discrete components 248, such as external electrical interfaces, external RAM, resistors, capacitors, or other components that may interface with memory controller 122. In alternative embodiments, one or more of the host connection 222, RAID module 228, media management layer 238 and buffer management/bus controller 214 are optional components that are not necessary in the memory controller 122.

The Media Management Layer (MML) 238 (which in one embodiment is a Flash Translation Layer (FTL)) may be integrated as part of the memory cell management that may handle memory cell errors and interfacing with the host. For example, MML may be a module in flash management and may be responsible for the internals of NAND management. In particular, the MML 238 may include an algorithm in the memory device firmware which translates writes from the host into writes to the memory structure 126 of die 108. The MML 238 may be needed because: 1) the memory may have limited endurance; 2) the memory structure 126 may only be written in multiples of ECC pages; and/or 3) the memory structure 126 may not be written unless it is erased as a block. The MML 238 understands these potential limitations of the memory structure 126 which may not be visible to the host. Accordingly, the MML 238 attempts to translate the writes from host into writes into the memory structure 126.

Memory controller 122 may interface with one or more memory dies 108. In one embodiment, memory controller 122 and multiple memory dies (together comprising non-volatile memory system 100) implement a solid state drive (SSD), which can emulate, replace or be used instead of a hard disk drive inside a host, as a Network Attached Storage (NAS) device, laptop, tablet, etc. Additionally, the SSD need not be made to work as a hard drive.

Figure 2B:
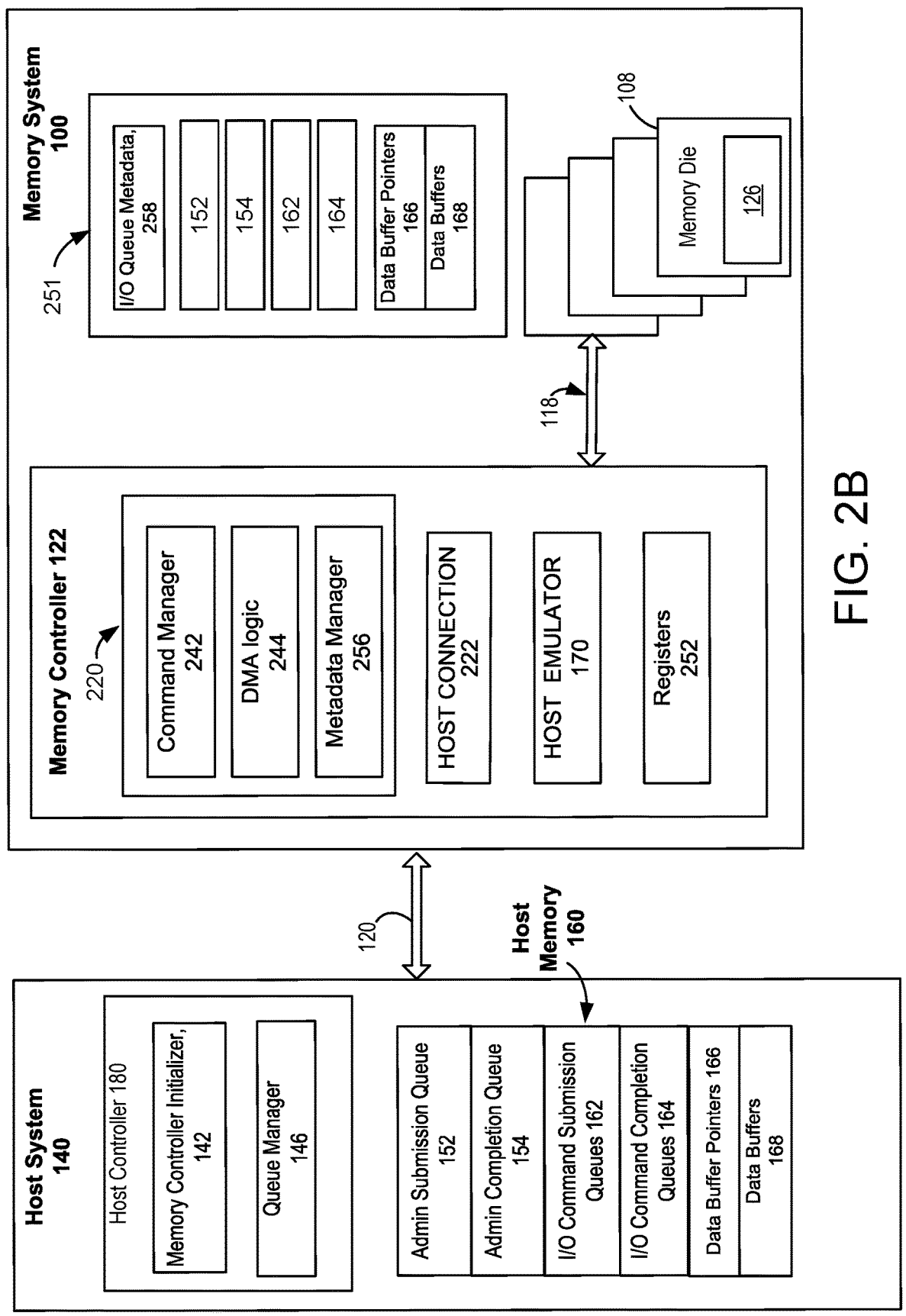
FIG. 2B is a block diagram of example non-volatile memory system and host system.

FIG. 2B is a block diagram of example non-volatile memory system 100 and host system 140. In one embodiment, the host emulator 170 emulates at least some of the operation of the host controller 180. Thus, the host emulator 170 may be used if, for example, the host system 140 is not available.

In one embodiment, the system of FIG. 2B is a solid state drive. In one embodiment, the host system 140 may use host memory 160 to store an admin submission queue 152, an admin completion queue 154, one or more I/O command submission queues (SQs) 162 and one or more I/O command completion queues (CQs) 164. Note that the reference numeral 162 will be used herein whether referring to a specific SQ or the SQs in general. Likewise, the reference numeral 164 will be used herein whether referring to a specific CQ or the CQs in general. Further, the term "I/O queue" may be used as a general term to refer to the SQs 162 and CQs 164. The host memory 160 also includes data buffer pointers 166. The data buffer pointers 166 identify locations in the data buffers 168. In embodiments, the memory controller 122 uses the data buffer pointers 166 to perform DMAs to satisfy a read or write command. In one embodiment, the data buffer pointers 166 are NVMe "Physical Region Page" (PRP) entries.

However, if the host system 140 is not available, then the admin submission queue 152, admin completion queue 154, one or more I/O command submission queues (SQs) 162, one or more I/O command completion queues (CQs) 164, data buffer pointers 166, and data buffers 168 may be stored in storage 251 to implement a host emulator mode. Note that when the memory system 100 is in an embodiment of the host emulator mode, the host memory 160 is not used. Likewise, when the memory system 100 is in an embodiment of the functional mode, storage 251 does not contain the admin submission queue 152, admin completion queue 154, I/O command submission queues (SQs) 162, I/O command completion queues (CQs) 164, data buffer pointers 166, and data buffers 168 (host memory 160 is used instead). Also note that in some embodiments of a host emulator mode, storage 251 is not used to store some or all of admin submission queue 152, admin completion queue 154, I/O command submission queues (SQs) 162, I/O command completion queues (CQs) 164, data buffer pointers 166, and data buffers 168.

The admin submission queue 152 and admin completion queue 154 may be used to control and manage the memory controller 122. For example, the host controller 180 (or host emulator 170) may place administrative commands on the admin submission queue 152. In one embodiment, the admin submission queue 152 and admin completion queue 154 are an NVMe admin submission queue and admin completion queue, respectively.

The host controller 180 (or host emulator 170, depending on the mode) places I/O commands onto the SQs 162 (in host memory 160 for host controller, in storage 251 for host emulator). The I/O commands include commands to access the memory structure 126 in the memory die 108. For example, an I/O command might be to read from or write to the memory structure 126. In one embodiment, an SQ 162 is a circular buffer with a fixed size slot. In one embodiment, the host (or host emulator 170) informs the non-volatile memory device when a new command has been placed on an SQ 162. One such mechanism is referred to herein as a "doorbell." The "doorbell" refers to a register in the memory controller 122, which is referred to as a "doorbell register." In one embodiment, SQs 162 and CQs 164 are NVMe command submission queues and command completion queues, respectively.

The memory controller 122 (e.g., host interface 220) may write to an associated CQ 164 (in host memory 160 when in host mode, in storage 251 when in host emulator mode) to post status for completed commands. In one embodiment, a CQ 164 is a circular buffer with a fixed size slot. The term "queue," as used herein (including, but not limited to admin submission queue 152, admin completion queue 154, SQs 162 and CQs 164) means non-transitory storage containing a data structure. The non-transitory storage could be, for example, host memory 160, RAM 122*b*, memory structure 126, etc. Thus, the admin submission queue 152, admin completion queue 154, SQs 162 and CQs 164 are software queues, in some embodiments.

The storage 251 may optionally also be used to store I/O queue metadata 258. The I/O queue metadata 258 is data about the admin queues 152, 154, SQs 162, and CQs 164. The I/O queue metadata 258 may include the addresses of the various queues 152, 154, 162, 164. Note that one or more of the queues 152, 154, 162, 164 could be located in memory on the memory system 100. The I/O queue metadata could include the size of each queue. For example, there may be a base address and size for a given queue. Note that a given queue is not required to be contiguous in the host memory 160. Thus, there could be multiple pointers to locations in host memory 160 for a given queue.

The I/O queue metadata 258 may also contain an identifier for each queue. In one embodiment, the Admin Queues 152, 154 are each assigned the identifier of "0". The I/O queue metadata 258 may also contain a mapping between SQs 162 and CQs 164. In one embodiment, each SQ 162 is mapped to a CQ 164. This is used to specify what CQ 164 the memory controller 122 should place command responses for commands from a given SQ 162. Note that the "command responses" may also be referred to as "command status." In one embodiment, multiple SQs 162 can mapped to the same CQ 164.

The I/O queue metadata 258 may also specify an interrupt vector for a CQ 164. In one embodiment, each CQ 164 is associated with an interrupt vector. The memory controller 122 may write to the interrupt vector associated with a CQ 164 upon placing one or more command responses on the CQ. Thus, the interrupt vector is a technique to provide a command completion notice, in one embodiment. Other techniques may be used to provide a command completion notice. Note that a given interrupt vector could be associated with more than one CQ 164. In one embodiment, the host emulator 170 provides a suitable interrupt vector such that the host interface 220 will use the interrupt to response to the host emulator 170 (as opposed to responding to the host system 140)

The I/O queue metadata 258 may also contain head pointers and tail pointers for the queues 152, 154, 162, 164, which may be maintained by the queue manager 146. In one embodiment, a head pointer is an index that specifies a slot or entry of a queue. Likewise, in one embodiment, a tail pointer is an index that specifies a slot or entry of a queue.

The tail pointer for the admin submission queue 152 may point to the last administrative command that the host system 140 placed on the admin submission queue 152. The head pointer for the admin submission queue 152 may be used to track the next free slot on the admin submission queue 152. The tail pointer for the admin completion queue 154 may point to the last response to an administrative command that the memory controller placed on the admin completion queue 154. The head pointer for the admin completion queue 154 may be used to track the next free slot on the admin completion queue 154.

The tail pointer for an SQ 162 may point to the last I/O command that the host system 140 placed on the SQ 162. The head pointer for SQ 162 may be used to track the next free slot on the SQ 162. The tail pointer for a CQ 164 may point to the last response to an I/O command that the memory controller placed on the CQ 164. The head pointer for the CQ 164 may be used to track the next free slot on the CQ 164.

In some embodiments, the memory controller 122 (e.g., host interface 220) sends an interrupt message to inform the host system 140 (or host emulator 170, depending on the mode) that one or more command responses have been placed on a CQ 164. The interrupt message may specify an interrupt vector. The contents of the interrupt message may vary depending on the implementation. For example, the interrupt message contains an address and data which together trigger an interrupt, in one embodiment. The combination of the address and data make up an "interrupt vector," in one embodiment. In one embodiment, the interrupt messages are MSI (Message Signaled Interrupts). In one embodiment, the interrupt messages are MSI-X (which is an extension to MSI). Note that "writing to an interrupt vector," as the phrase is used herein, may be achieved by the host interface 220 sending an interrupt message such as an MSI or MSI-X message.

Note that a portion of host memory 160 may be used for data buffers in which the host system 140 may store data to be written to the memory structure 126. Also, the memory controller 122 may store data that was read from the memory structure 126 into the data buffers 168 in host memory 160. While in the host emulator mode, a portion of storage 25 may be used for data buffers 168 in which the host emulator 170 may store data to be written to the memory structure 126. Also, the memory controller 122 may store data that was read from the memory structure 126 into the data buffers 168 in storage 251.

The host system 140 has a host controller 180. A host controller 180, as the term is used herein, is a device that communicates with a host interface 220 in a non-volatile memory controller 122 in order to access non-volatile memory, which is under the control of the non-volatile memory controller 122. The host controller 180 implements the host system 140 side of a logical device interface, during a functional mode of operation. The host interface 220 in the non-volatile memory controller implements the memory controller side of the logical device interface. Host controller 180 may be configured to implement host controller functions of a memory access protocol, including but not limited to NVMe.

The host controller 180 has a queue manager 146, which may be configured to manage the admin submission queue 152, admin completion queue 154, SQs 162, and CQs 164. The queue manager 146 is configured to allocate memory in host memory 160 for the queues 152, 154, 162, 164, in one embodiment. As noted above, one or more of the queues 152, 154, 162, 164 could be located in memory in the memory system 100. In this case, the queue manager 146 may be configured to allocate memory in the memory system 100 for one or more of the queues 152, 154, 162, 164, in one embodiment. The queue manager 146 is configured to maintain head pointers and tail pointers of the queues 152, 154, 162, 164, in one embodiment.

The host controller 180 has a memory controller initializer 142, which may be configured to initialize the memory controller 122. The memory controller initializer 142 may work in combination with the queue manager 146 to perform one or more of the following during initialization. A portion of host memory 160 may be allocated for the admin submission queue 152 and admin completion queue 154. The memory controller initializer 142 may place administrate commands on the admin submission queue 152 to establish various settings for the memory controller 122, as well as to learn the configuration of the memory controller 122. The host system 140 may allocate an appropriate number of SQs 162 and CQs 164 based on the configuration of the memory controller 122, number of queues supported by the memory controller 122, as well as other factors. For example, the host system 140 may allocate portions of host memory 160 for SQs 162 and CQs 164. The memory controller initializer 142 may send addresses of the SQs 162 and CQs 164 to the memory controller 122.

The memory controller initializer 142 and queue manager 146 may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include or comprise software stored in a processor readable device (e.g., host memory 160) to program one or more processors 150 to perform the functions described herein.

The memory controller 122 also has a number of registers 252. The registers 252 may be used to store information used to facilitate implementation of a memory access protocol (such as, but not limited to, NVMe). The registers 252 may be used to store information used to facilitate implementation of a bus transfer protocol, such as PCIe registers. The host system 140 may have access to one or more of the registers 252. There may be an Admin Submission Queue Base Address Register, which the host system 140 may write to in order to provide the base address of Admin Submission Queue 152. There may be an Admin Completion Queue Base Address Register, which the host system 140 may write to in order to provide the base address of Admin Completion Queue 154.

The registers 252 may include a number of "doorbell registers." Herein, a "doorbell register" is a register that is written to by either the host system 140 or the memory controller 122 to inform the other that there is a new entry on an admin submission queue 152, admin completion queue 154, SQ 162 or CQ 164. Note that the registers 252 may be implemented with any type of storage. For example, some or all of the registers 252 may be implemented with flip-flops. However, some or all of the registers 252 could be implemented in RAM 122*b* (e.g., SRAM, DRAM). Some of all of the registers 252 may be implemented in memory cells in structure 126 (e.g., storage device region 126*a*). The doorbell registers may also be referred to as "doorbell storage."

The doorbell registers include a set of submission queue tail doorbell registers, in one embodiment. Each submission queue tail doorbell register pertains to either the admin submission queue 152 or one of the SQs 162, in one embodiment. A "submission queue tail doorbell register" (which may also be referred to as a "submission queue doorbell register") is written to by the host controller 180 to inform the memory controller 122 that the host system 140 has placed one or more commands on the associated admin submission queue 152 or SQ 162, in first mode of one embodiment. The host emulator 170 writes to the submission queue tail doorbell register in a second mode of the aforementioned embodiment.

The doorbell registers include a set of completion queue head doorbell registers, in one embodiment. Each completion queue head doorbell register pertains to either the admin completion queue 154 or one of the CQs 164, in one embodiment. A "completion queue head doorbell register" (which may also be referred to as a "completion queue doorbell register") is written to by the host emulator 170 to inform the memory controller 122 that one or more completion entries have been consumed, in one embodiment. Note that the host controller 180 (or host emulator 170 depending on the mode) does not need to poll the completion queue doorbell registers to learn about new command responses, in one embodiment. Instead, the memory controller 122 sends an interrupt to notify that one or more command response have been placed on, for example, a CQ 164. The registers 252 are not required to contain all of the just described functionality. Also, there may be many other type of registers 252 not expressly described herein.

The host interface 220 (in the memory controller 122) includes a command manager 242 and DMA logic 244. The command manager 242 is configured to fetch and parse commands from SQs 162. The command manager 242 may also queue the commands internally (i.e., within the memory controller 122) for execution. In one embodiment, the command manager 242 determines when to send a command from the internal queue (within the memory controller 122) to a command executer within a backend module of the memory controller. In one embodiment, the command manager 242 also sends an indication to the host system 140 (or host emulator 170, depending on the mode) when a command is complete. For example, the command manager 242 could store command responses on a CQ 164 when a command (such as a read or write command) is complete. The command manager 242 may write to an interrupt vector after it places one or more command responses on a CQ 164.

The command manager 242 is also configured to fetch and parse commands from the admin submission queue 152. In one embodiment, one of the commands that is fetched is for the memory controller 122 may be referred to as a "create I/O queue command." The create I/O queue command contains metadata about either an SQ 162 or a CQ 164, in one embodiment. The metadata may include one or more of the following: the memory location(s) of a queue, size of the queue, identifier of the queue, identifier of an SQ 162 associated with a CQ 164, and/or interrupt vector to write to after placing one or more command responses on a CQ 164. The command manager 242 stores this metadata as I/O queue metadata 258, in one embodiment.

DMA logic 244 is configured to control DMA transfer of data between the non-volatile memory system 100 and the host memory 160 in the host system 140. When the host emulator 170 is being used, the data transfer occurs within the memory system 100.

The queue metadata manager 256 is configured to store queue metadata 258 in storage 251. The queue metadata 258 contains information about SQs 162 and CQs 164, in one embodiment. The queue metadata manager 256 may store metadata about the SQs 162 and CQs 164 in queue metadata 258 when the memory controller 122 is initialized. For example, host emulator 170 may pass memory address of the SQs 162 and CQs 164 (in storage 251) to the memory controller 122 during initialization, wherein queue metadata manager 256 may store the memory address of the SQs 162 and CQs 164 as queue metadata 258 in storage 251. In one embodiment, the memory addresses of the SQs 162 and CQs 164 are addresses in storage 251.

The queue metadata 258 may include an identifier for each queue. The I/O queue metadata 258 may also contain a mapping between SQs 162 and CQs 164. The queue metadata 258 may also specify an interrupt vector for a CQ 164. In one embodiment, the interrupt vectors are stored in registers 252. The queue metadata 258 may also contain head pointers and tail pointers for the queues 152, 154, 162, 164. One embodiment of the head pointers and tail pointers have been described with respect to the I/O queue metadata 258 in storage 251.

Storage 251 could be implemented in volatile memory (e.g., RAM 122*b* of FIG. 2A) or non-volatile memory (e.g., memory structure 126). In one embodiment, at least a portion of storage 251 is implemented in registers 252. For example, interrupt vectors could be implemented in registers 252. Also, doorbell registers may be used to contain tail pointers to SQs 162, as well as head pointers to CQs 164. However, note that the memory controller 122 could maintain copies of the tail pointers to SQs 162, as well as head pointers to CQs 164, independent of the doorbell registers. In one embodiment, a copy of the queue metadata 258 is stored in non-volatile memory, such that the queue metadata 258 will persist in the event that power is lost.

The components of memory controller 122 depicted in FIG. 2B may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, all or a portion of each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or additionally, all or a portion of each module may include or comprise software stored in a processor readable device (e.g., memory) to program a one or more processors for memory controller 122 to perform the functions described herein. The architecture depicted in FIG. 2B is one example implementation that may (or may not) use the components of memory controller 122 depicted in FIG. 1B (e.g., RAM 122*b*, ROM 122*a*, processor 122*c*).

FIGS. 2A and 2B each show a non-volatile memory system 100 having one non-volatile memory controller. In such embodiments, the non-volatile memory system 100 has more than one non-volatile memory controller. For example, in NVMe, there may be more than one NVMe controller in a memory system 100. Also note that although in some embodiments, the memory access protocol is NVMe, the memory access protocol is not limited to NVMe.

Figure 3A:
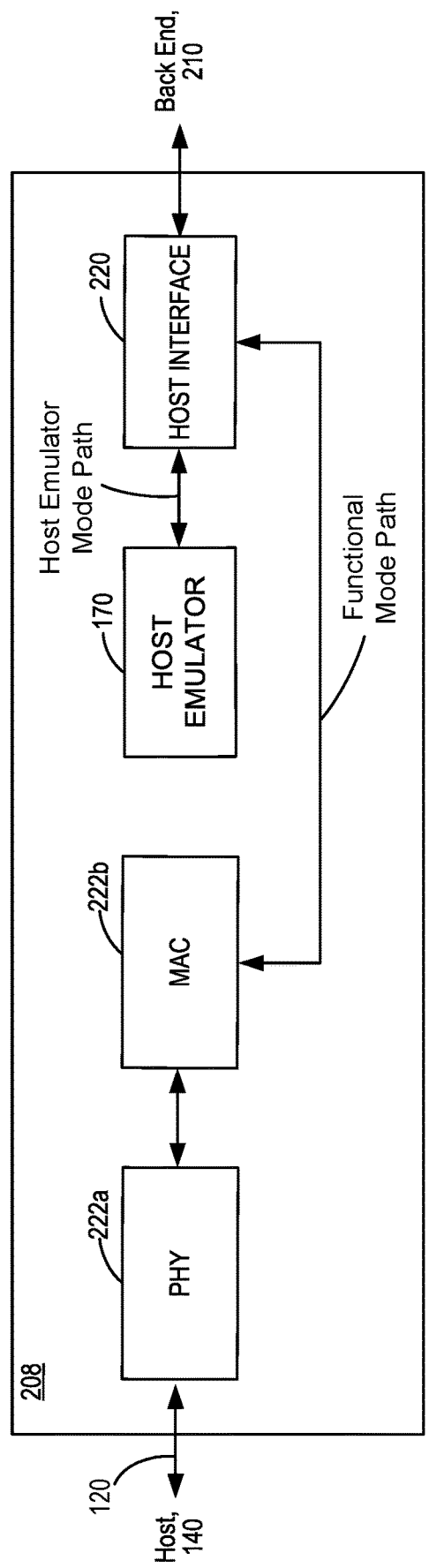
FIG. 3A is a block level diagram showing further details of one embodiment of front end module of memory controller.

FIG. 3A is a block level diagram showing further details of one embodiment of front end module 208 of memory controller 122. The front end module 206 includes PHY 222a, MAC 222b, host emulator 170, and host interface 220. The PHY 222a and MAC 222b are part of one embodiment of the host connection 222. The front end module 208 has a functional mode and a host emulator mode, in an embodiment. Data paths for each mode are depicted in FIG. 3A.

In the functional mode, the host interface 200 communicates with the MAC 222b on the functional mode path. In one embodiment, functional mode path comprises an AXI bus. The PHY 222a and MAC 222b are used to communicate with host system 140, during the functional mode. For example, PHY 222a and MAC 222b may implement physical, link and transport layers of a communication protocol used over the connection to the host. The host system 140 is not needed when the front end module 206 is in the host emulator mode.

The host emulator 170 is used to emulate at least some of the functionality of the host system 140 during the host emulator mode, in an embodiment. The host emulator 170 may be used to implement a host side of a memory access protocol, such as, for example, NVMe. FIG. 3A depicts a Host Emulator Mode Path from the host emulator 170 to the host interface 220. Thus, the PHY 222a and MAC 222b are not used in an embodiment of the host emulator mode.

The components in the front end 208 may be implemented in hardware, software, or a combination of hardware and software. In embodiments, to implement the components, the front end 208 may include one or more application specific integrated circuits (ASIC), one or more Field Programmable Gate Array (FPGA), one or more state machines, one or more circuits, one or more digital logic circuits, one or more analog circuits, a combination of discrete circuits, gates, or any other type of hardware or combination thereof. Alternatively or in addition, the front end 208 may include software stored in one or more processor readable devices (e.g., ROM 122a, RAM 122b, storage device region 126a) to program one or more processors (e.g., processor 122c) to implement the functionality of the components depicted in FIG. 3A.

Figure 3B:
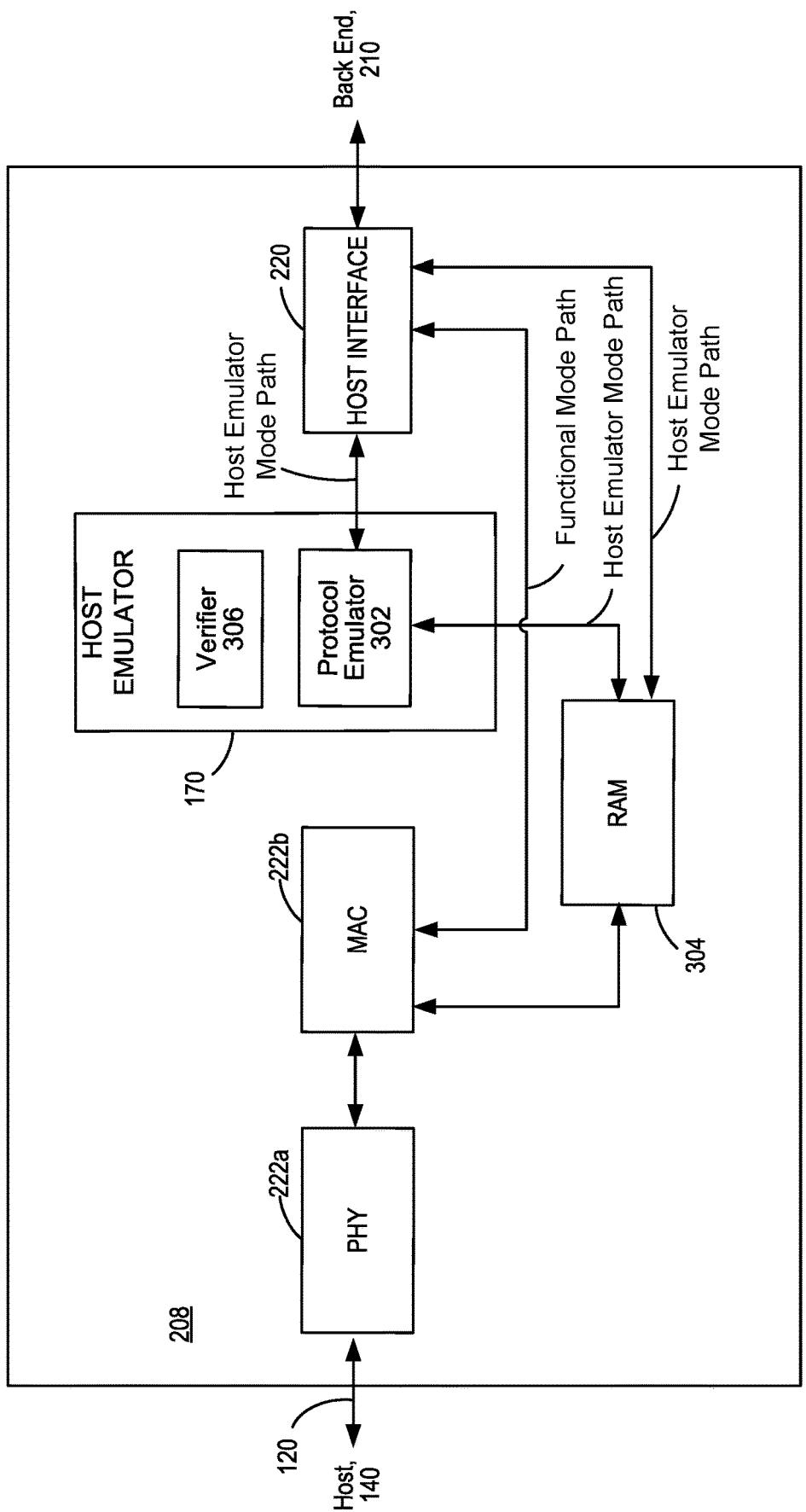
FIG. 3B is a block level diagram showing further details another one embodiment of front end module of memory controller.

FIG. 3B is a block level diagram showing further details of one embodiment of front end module 208 of memory controller 122. The front end module 206 includes PHY 222a, MAC 222b, host emulator 170, host interface 220, and RAM 304. RAM 304 is part of RAM 122b, in an embodiment. The front end module 208 has a function mode and a host emulator mode, in an embodiment. Data paths for each mode are depicted in FIG. 3B.

In the functional mode, the host interface 200 communicates with the MAC 222b on the functional mode path. In one embodiment, functional mode path comprises an AXI bus. The MAC 222b has access to RAM 304 during the functional mode. The PHY 222a and MAC 222b are used to communicate with host system 140, during the functional mode. For example, PHY 222a and MAC 222b may implement physical, link and transport layers of a communication protocol used over the connection to the host. The host system 140 is not needed when the front end module 206 is in the host emulator mode.

The host emulator 170 includes a protocol emulator 302, which is used to emulate at least some of the functionality of the host system 140 during the host emulator mode, in an embodiment. The protocol emulator 302 may be used to implement a host side of a memory access protocol, such as, for example, NVMe. The protocol emulator 302 has access to RAM 304 during the host emulator mode. In one embodiment, this is the same RAM used by the MAC 222b during the functional mode. Therefore, the host emulator mode does not require that additional memory be added to the memory device, in an embodiment. However, there could be separate memory (e.g., RAM), or separate regions dedicated within memory, for host emulator 170 and MAC 222b.

In one embodiment, the protocol emulator 302 uses RAM 304 for command queues and data buffers. The command queues are used to place memory access requests, in an embodiment. The memory access requests are requests to access (e.g., read or write) non-volatile memory cells in memory structure 126, in an embodiment. For a write command, the protocol emulator 302 writes data to the data buffers (in RAM 304) and the host interface 220 reads the data from RAM 304, in an embodiment. For a read command, the host interface 220 writes data to the data buffers (in RAM 304) and the host interface 220 reads the data which host interface 220 write to the RAM 304, in an embodiment. There is a path labeled "Host Emulator Mode Path" between the protocol emulator 302 and RAM 304 to indicate that this path is used during the Host Emulator Mode (but not during the functional mode), in an embodiment. There is a path labeled "Host Emulator Mode Path" between the host interface 220 and RAM 304 to indicate that this path is used during the Host Emulator Mode (but not during the functional mode), in an embodiment.

FIG. 3B also depicts a Host Emulator Mode Path from the host emulator 170 to the host interface 220. This path may be used by the host emulator 170 to, for example, inform the host interface 220 that there is a command (e.g., memory access request) in a command queue in RAM 304. In one embodiment, the protocol emulator 302 write to a register (e.g., NVMe doorbell register) to inform the host interface 220 that there is a command on a command submission queue in RAM 304.

In one embodiment, during the functional mode, the host interface 220 sends a signal to the MAC 222b that is forwarded on to the host system 140 to indicate that a command (e.g., memory access request) has completed. In one embodiment, during the host emulator mode, this signal is instead routed to the host emulator 170. Thus, the host interface 220 operates in the same way during both the functional mode and the host emulator mode, in an embodiment. In one embodiment, the signal is an interrupt.

The host emulator 170 has a verifier 306 in an embodiment. The verifier 306 is used during testing of the memory device. The verifier 306 may be used to verify whether the host interface 220 is operating properly. The verifier 306 may also be used to verify at least some of the functionality in the back end module 210. The verifier 306 may also be used to verify at least some of the functionality in the memory structure 126, in an embodiment. For example, the host emulator 170 may instruct the host interface 220 to write a data pattern to the memory structure. Then, the host emulator 170 may instruct the host interface 220 to read those memory cells, wherein the verifier 306 may verify whether the data pattern was successfully written and read.

Figure 3C:
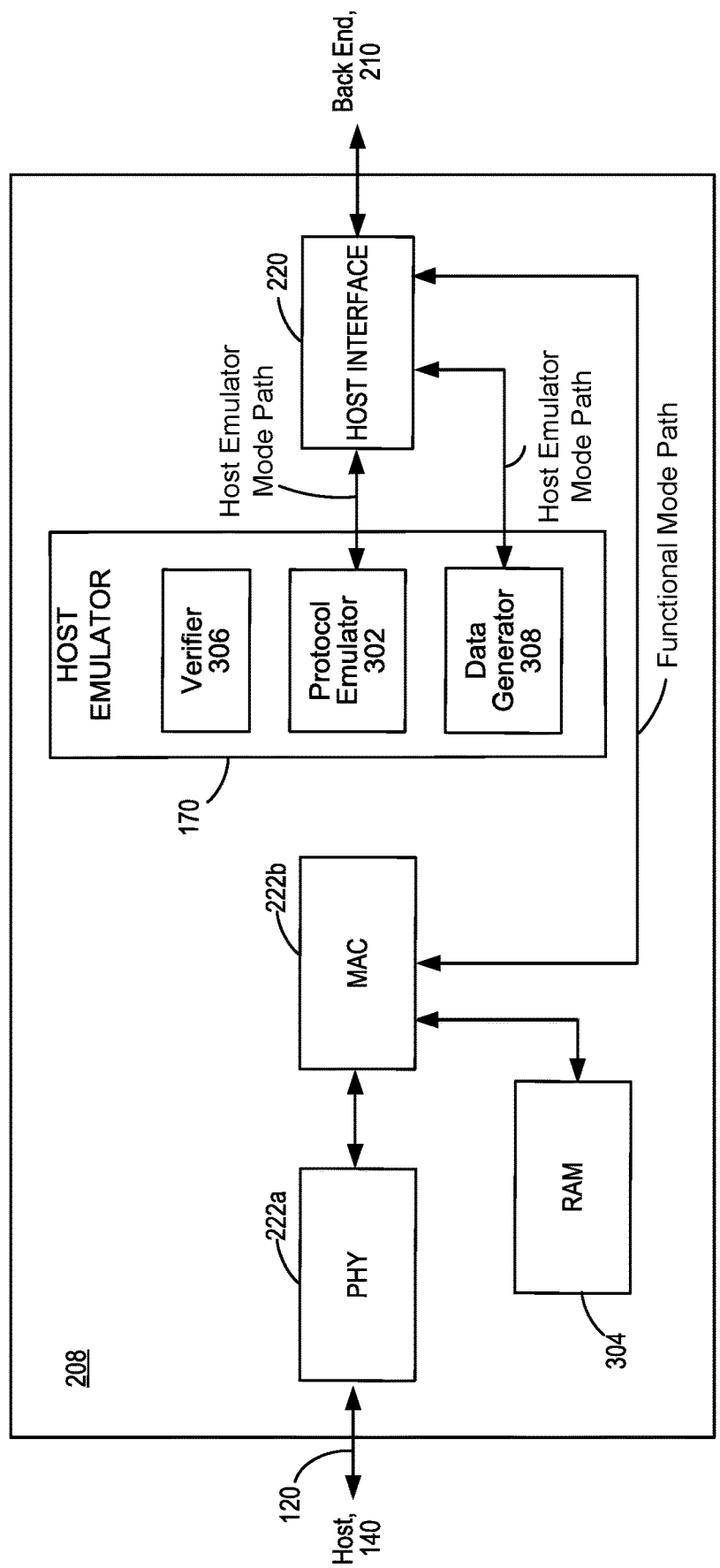
FIG. 3C depicts a block level diagram showing further details of one embodiment of the front end module of memory controller having a data generator.

FIG. 3C depicts a block level diagram showing further details of one embodiment of the front end module 208 of memory controller 122 having a data generator. The front end module 206 includes PHY 222a, MAC 222b, host emulator 170, host interface 220, and RAM 304. The host emulator 170 has a data generator 308, in one embodiment.

In one embodiment, the RAM 304 is not used as a data buffer to store data to be written while in the host emulator mode. Instead the host emulator 170 has a data generator 308 to generate the data. For example, the data generator 308 could be used to generate a pattern, which the host interface 220 writes to memory structure 126 during the host emulator mode.

The data generator 308 may mimic the use of a data buffer, such as data buffers 168. For example, when the host interface 220 sends a request to the data generator 308 for data at an address pointed to by a data buffer pointer, the data generator 308 may provide data that would otherwise be stored at that address. Therefore, the data generator 308 alleviates the need to provide data buffers within the memory device 100 for the host emulator mode. Note that the host interface 220 need not be modified to operate with the data generator 308.

The data generator 308 may also mimic the use of I/O queues. For example, the data generator 308 may be used to provide memory access commands to the host interface 220 during the host emulator mode. For example, when the host interface 220 sends a request to the data generator 308 for a command on an I/O queue, the data generator 308 may provide a command that would otherwise be stored on that I/O queue. Therefore, the data generator 308 alleviates the need to provide I/O queues within the memory device 100 for the host emulator mode. Again, note that the host interface 220 need not be modified to operate with the data generator 308.

In some embodiment, both the RAM 304 and the data generator 308 are used in the host emulator mode for processing memory access commands. For example, the data generator 308 could be used to provide memory access commands, and the RAM 304 used to provide user data. In one embodiment, special (exception) commands are stored in RAM 304, but the data generator 308 is used for normal and full performance commands. Other combinations of using both the RAM 304 and data generator 308 are possible.

Figure 4:
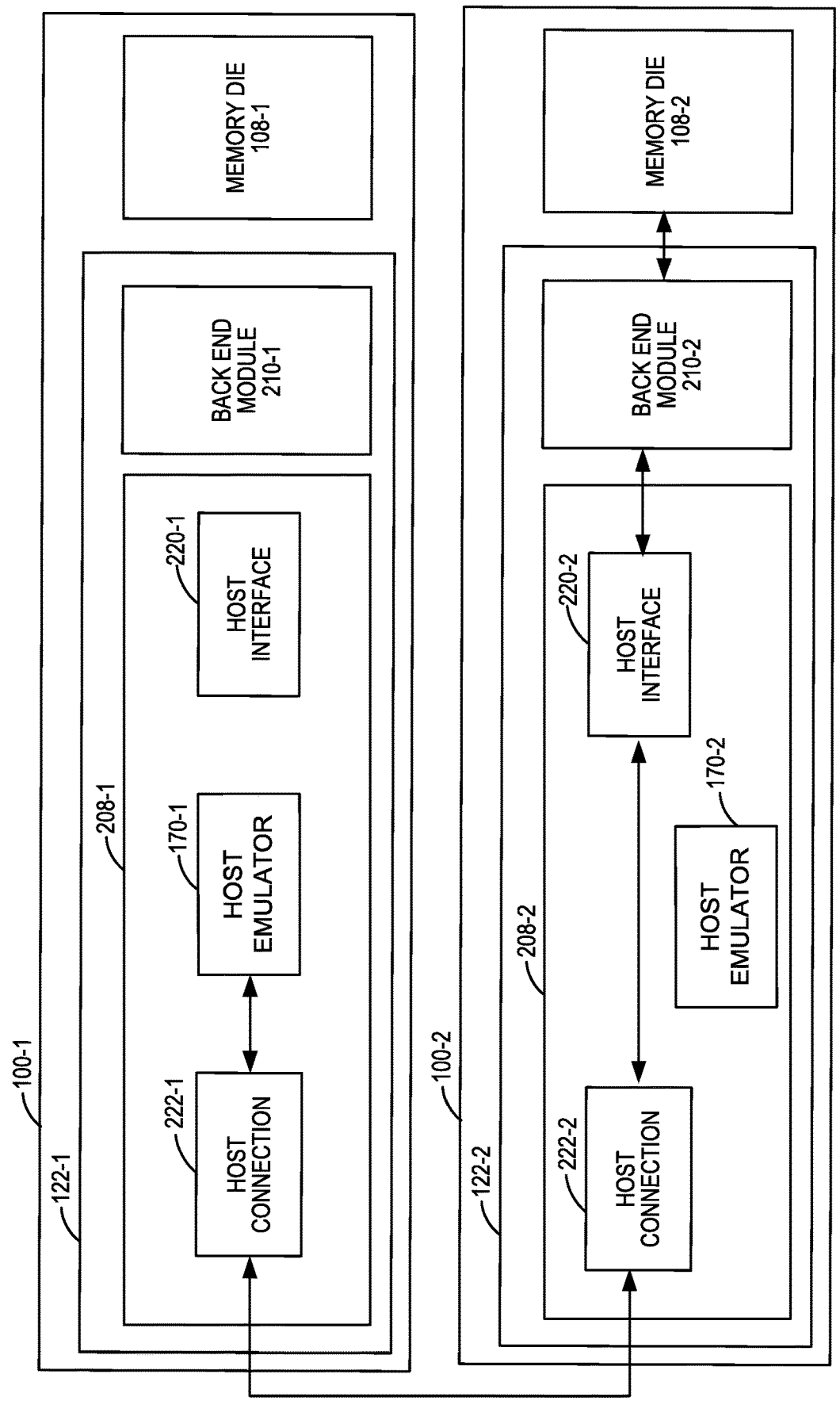
FIG. 4 depicts an embodiment of a memory device having a host emulator being used to test another memory device.

FIG. 4 depicts an embodiment of a memory device having a host emulator being used to test another memory device. Memory device 100-1 is being used to test memory device 100-2. Memory device 100-1 has a host connection 222-1, host emulator 170-1, and host interface 220-1 in front end module 208-1 of memory controller 122-1. Memory device 100-2 has a host connection 222-2, host emulator 170-2, and host interface 220-2 in front end module 208-2 of memory controller 122-2. Host emulator 170-1 is being used to emulate a host that could otherwise be connected to memory device 100-2. Host emulator 170-1 may send commands (e.g., memory access requests) to host interface 220-2. For example, host emulator 170-1 may send commands through host connection 222-1 to host connection 222-2. Those commands may be accessed by host interface 220-2. Memory device 100-2 may also have a host emulator 170-2, although that is not required. The host emulator 170-2 in memory device 100-2 is not used when host emulator 170-1 is being used to test memory device 100-2. This configuration may be used to test host connection 222-2 in memory device 100-2. This configuration may be used to test host connection 222-1 in memory device 100-1. Note that in some embodiments, such as an embodiment of FIG. 3A, the PHY 222a and MAC 222b are not used in the host emulator mode. Therefore, the configuration of FIG. 4 can test portions of the memory device that are not tested in an embodiment of the host emulator mode using a single memory device. The configuration of FIG. 4 may be used to test other components in memory device 100-2, such as host interface 220-2, back end module 210-2, and memory die 108-2. Note that host interface 220-1, back end module 210-1 and memory die 108-1 are not required to be used when host emulator 170-1 is being used to test memory device 100-2. The configuration can be reversed such that host emulator 170-2 is used to test memory device 100-1.

Figure 5:
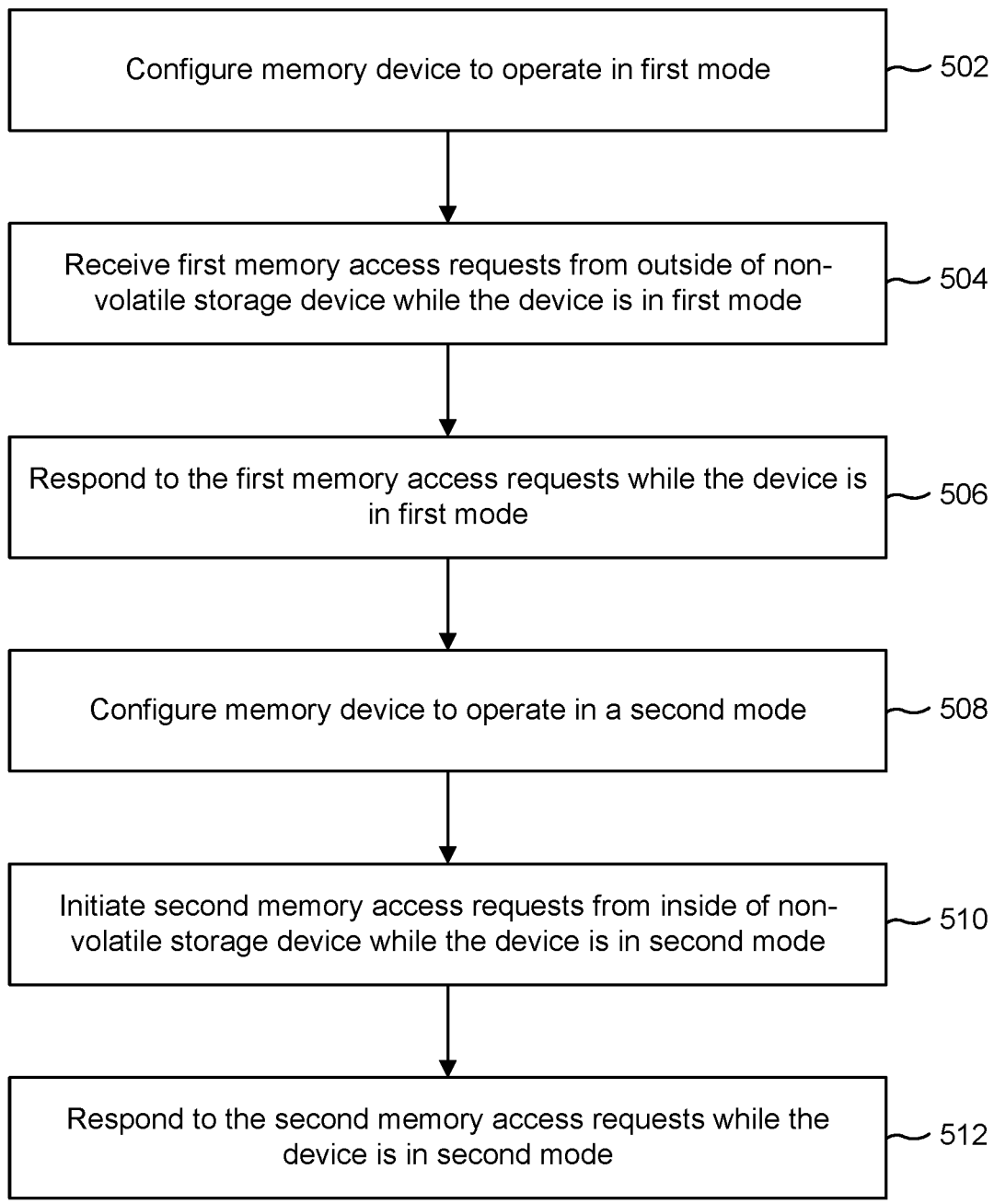
FIG. 5 is a flowchart of one embodiment of a process of operating non-volatile storage.

FIG. 5 is a flowchart of one embodiment of a process 500 of operating a non-volatile storage device. The non-volatile storage device may also be referred to as a non-volatile memory device or "memory device." Steps 508-512 of process 500 allow the memory device to be tested even if there is not host system 140 with which to interact.

Step 502 incudes configuring the memory device 100 to operate in a first mode. The first mode is referred to as a functional mode, in one embodiment. Step 502 includes sending a vender specific command to the memory device 100, in one embodiment. The vender specific command is a command in a memory access protocol, in one embodiment. Step 502 includes issue a signal on a pin of the memory device 100, in one embodiment. In one embodiment, an eFuse is used to enter the functional mode.

Steps 504-506 are performed with a host system 140 connected to the memory device 100. Step 504 includes receiving first memory access requests from external to the non-volatile storage device while the non-volatile storage device is in the first mode. The first memory access requests are compliant with a memory access protocol that enables a host system 140 that is external to the non-volatile storage device to access to non-volatile memory (e.g., memory structure 126 of memory cells). In one embodiment, host controller 180 in host system 140 sends the memory access requests to the memory device 100. In one embodiment, host controller 180 in host system 140 places the memory access requests on I/O command submission queue 162 (which may be in the host system 140). In this latter case, memory device (e.g., host interface 220) receives the first memory access requests by obtaining them from the I/O command submission queue 162.

Step 506 includes responding to the first memory access requests by a memory controller 122 within the non-volatile storage device while in the first mode. Step 506 includes transferring data between the non-volatile memory (e.g., memory structure 126) and non-transitory storage external to the non-volatile storage device. The non-transitory storage external to the non-volatile storage device is within host system 140, in an embodiment. The non-transitory storage includes data buffers 168 in the host system 140, in one embodiment.

Step 508 incudes configuring the memory device 100 to operate in a second mode. The second mode is referred to as a host emulator mode, in one embodiment. Step 508 includes sending a vender specific command to the memory device 100, in one embodiment. The vender specific command is sent from outside of the memory device 100, in one embodiment. For example, host controller 180 could send the vender specific commands. The vender specific command is a command in a memory access protocol, in one embodiment. Step 508 includes issue a signal on a pin of the memory device 100, in one embodiment. In one embodiment, an eFuse is used to switch between modes. Note that the memory device 100 is reset after leaving the functional mode and before entering the host emulator mode, in an embodiment. Likewise, the memory device 100 is reset after leaving the host emulator mode before entering the functional mode, in an embodiment. The memory device 100 does not operate in both the host emulator mode and the functional mode at the same time.

Steps 510-512 are performed without a host system 140 connected to the memory device 100, in an embodiment. Step 510 includes initiating second memory access requests from within the non-volatile storage device 100 while in a second mode of the non-volatile storage device. The second memory access requests compliant with the memory access protocol used in steps 504-506. To initiate the second memory access requests from within the non-volatile storage device 100 means that the second memory requests are not generated in response to a memory command from a host system 140. The second memory requests are initiated by host emulator 170, in an embodiment. Step 510 includes the host emulator 170 storing the second memory access requests on one or command queues, in an embodiment.

Step 512 includes responding to the second memory access requests by the memory controller 122 while in the second mode. Step 512 includes responding without transferring any data between the non-volatile memory (e.g., structure 126) and non-transitory storage external to the non-volatile storage device 100. In one embodiment, the host interface 220 responds by accessing data that was written to a data buffer in the memory device, and writing the data to the non-volatile memory (e.g., structure 126), such that no data is transferred outside of the non-volatile storage device 100. In one embodiment, the host interface 220 responds by storing data to a data buffer in the memory device. The host emulator accesses the data such that no data is transferred outside of the non-volatile storage device 100.

Figure 6:
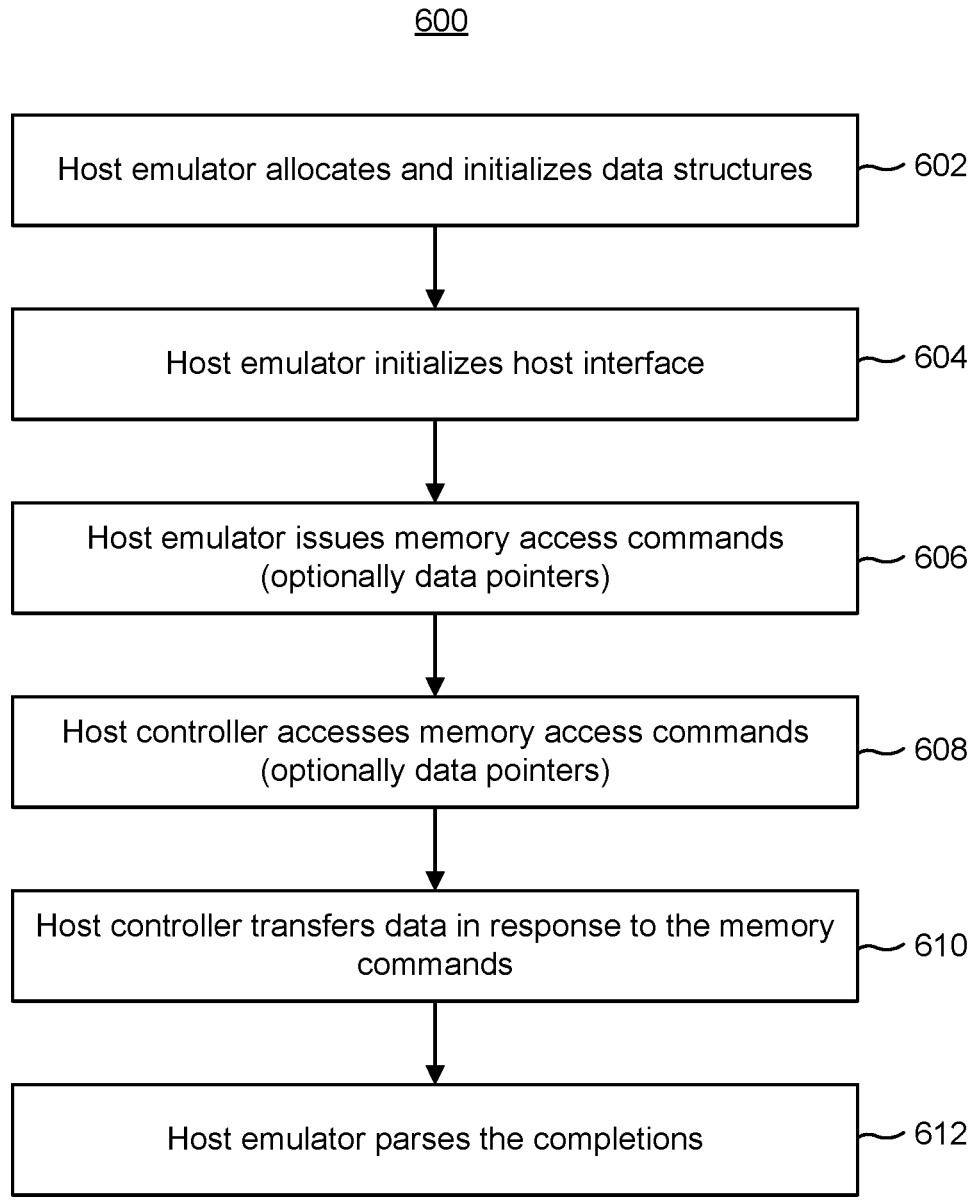
FIG. 6 depicts a flowchart that describes one embodiment of operating in a host emulator mode.

FIG. 6 depicts a flowchart that describes one embodiment of operating a non-volatile memory device in a host emulator mode. Prior to the process 600, the memory controller 122 has been configured to operate in the host emulator mode.

Steps 602-604 are referred to herein as an initialization phase. At step 602, the host emulator 170 allocates and initializes various data structures that are used for command processing, as well as data transfer. In one embodiment the host emulator 170 allocates submission queues 162, completion queues 164, data buffer pointers 166 and data buffers 168. In one embodiment, the allocations are in RAM 304.

Step 604 includes the host emulator 170 initializing the host interface 220. Step 604 includes providing the host interface 220 with information such as locations of I/O queues and interrupt vectors, in one embodiment. Step 604 may include establishing values in various registers in the host interface 220 in accordance with an initialization phase of a memory access protocol. Further details of an initialization phase for an NVMe embodiment are described below. Process 600 is not limited to NVMe.

Steps 606-612 describe executing memory access commands. These steps may be repeated many times. At step 606, the host emulator 170 issues memory access commands. In one embodiment, the host emulator 170, the memory access commands are placed on I/O command submission queues 162. These are NVMe command submission queues in one embodiment. The host emulator 170 may inform the host interface 220 of the commands by writing to a register in the host interface 220. In an NVMe embodiment, the host emulator 170 "rings the doorbell". Optionally, step 606 includes the host emulator 170 providing data pointers. The data pointers are stored in the data buffer pointers 166 in one embodiment. The data pointers point to specific addresses in data buffers 168, in one embodiment.

At steps 608-612, the host interface 220 executes the commands normally without even being aware that a host system 140 is not attached. Step 608 includes the host interface 220 accessing the memory access commands. In one embodiment, the host interface 220 accesses the commands from RAM 304. Optionally, the host interface 220 accesses data buffer pointers from the RAM 304.

Step 610 includes the host interface 220 transferring data in response to the memory commands. In one embodiment, the host interface 220 transfers data from memory structure 126 to the RAM 304 or alternatively, transfers data from the RAM 304 to memory structure 126. Step 610 also includes the host interface 220 posting completions with respect to the memory commands. In one embodiment, the host interface 220 posts to completion queues in the RAM 304. In one embodiment, data generator 308 is used to provide the data to be written to the memory structure 126.

At step 612, the host emulator 170 parses the completions. The host emulator 170 may verify whether the memory device is operating properly based on the completions. The process may then return to step 606 for the host emulator 170 to issue more memory access commands.

Figure 7:
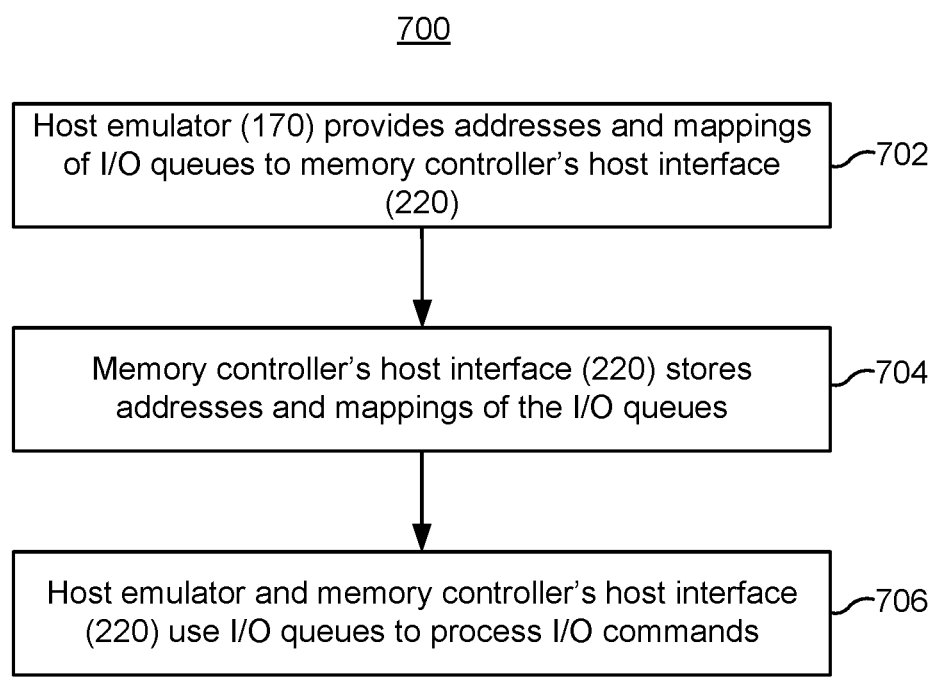
FIG. 7 is a flowchart of one embodiment of a process of creating I/O queues during initialization of a memory controller.

FIGS. 7-13 describe further details of embodiments in which the memory access protocol that is used in the host emulator mode is consistent with NVMe. It will be understood that the memory access protocol that is used in the host emulator mode is not limited to NVMe. FIG. 7 is a flowchart of one embodiment of a process 700 of operating non-volatile storage. In one embodiment, some or all steps of process 700 are performed in a memory system 100 such as depicted in FIG. 1B, 2A, or 2B. Some of the steps of process 700 may be performed by host emulator 170, with others performed by host interface 220. Thus, steps may be performed by any of the front ends 208 in FIG. 3A-3D or 4. The host emulator 170 performs steps that would otherwise be performed by the host system 140, in a host emulator 170 embodiment. In one embodiment, process 700 is performed separately for each non-volatile memory controller 122 in a memory system 100.

The process 700 begins in response to an initialization of the non-volatile memory controller 122. Note that when process 700 begins none of the I/O queues 162, 164 have been created. Likewise, the admin queues 152, 154 have not yet been created. In one embodiment, the initialization of the memory controller 122 is based on an NVMe protocol. However, the initialization phase is not limited to NVMe. The initialization may be performed after a power on reset of the memory system 100. The initialization may be used to establish values in registers such as PCIe registers. The initialization may be used to create a number of SQs 162 and CQs 164.

Step 702 includes the host emulator 170 providing memory addresses and mappings of I/O queues to the host interface 220 in the memory controller 122. In one embodiment, the host emulator 170 provides memory addresses of SQs 162 and SQs 162 in storage 251 on the memory system 100. In one embodiment, the memory addresses of SQs 162 are provided in NVMe create I/O submission queue commands. In one embodiment, the memory addresses of CQs 164 are provided in NVMe create I/O completion queue commands.

Note that to provide memory addresses of I/O queues means to provide sufficient information to specify the entire memory location of a given I/O queue. For example, the host emulator 170 might provide a base address and a length of an I/O queue that is contiguous in memory. In the event that an I/O queue is not contiguous in memory, then the information that the host emulator 170 provides might include a number of pointers to memory buffers of some fixed size, as one example. Other techniques may be used to specify the entire memory location of a given I/O queue.

Step 702 also includes the host emulator 170 providing mappings between the SQs 162 and the CQs 164. Each SQ 162 is mapped to a CQ 164 in one embodiment. The mapping between an SQ 162 and a CQ 164 may be referred to as an I/O queue pair. Note that multiple SQs 162 may be mapped to the same CQ 164, in one embodiment. The mapping tells the host interface 220 which CQ 164 should be used to place a command response for an I/O command that the host emulator 170 placed on an SQ 162.

Step 704 includes the host interface 220 storing the memory addresses and the mappings of the I/O queues 162, 164. The host interface 220 stores the addresses and mappings of the I/O queues 162, 164 as queue metadata 258 in storage 251, in one embodiment.

In step 706, the host emulator 170 and host interface 220 use the I/O queues 162, 164 to process commands. The host emulator 170 may place commands (e.g., read, write) on the SQs 162. The host interface 220 may access the commands and execute them. The host interface 220 may read data from the memory structure 126 and transfer the data to RAM 304, for one embodiment of a read command. The memory controller's host interface 220 may access data from RAM 304 and write that data to the memory structure 126, for one embodiment of a write command. The memory controller's host interface 220 may place command responses (for the commands the host placed on the SQs 162) on the CQs 164.

Figure 8:
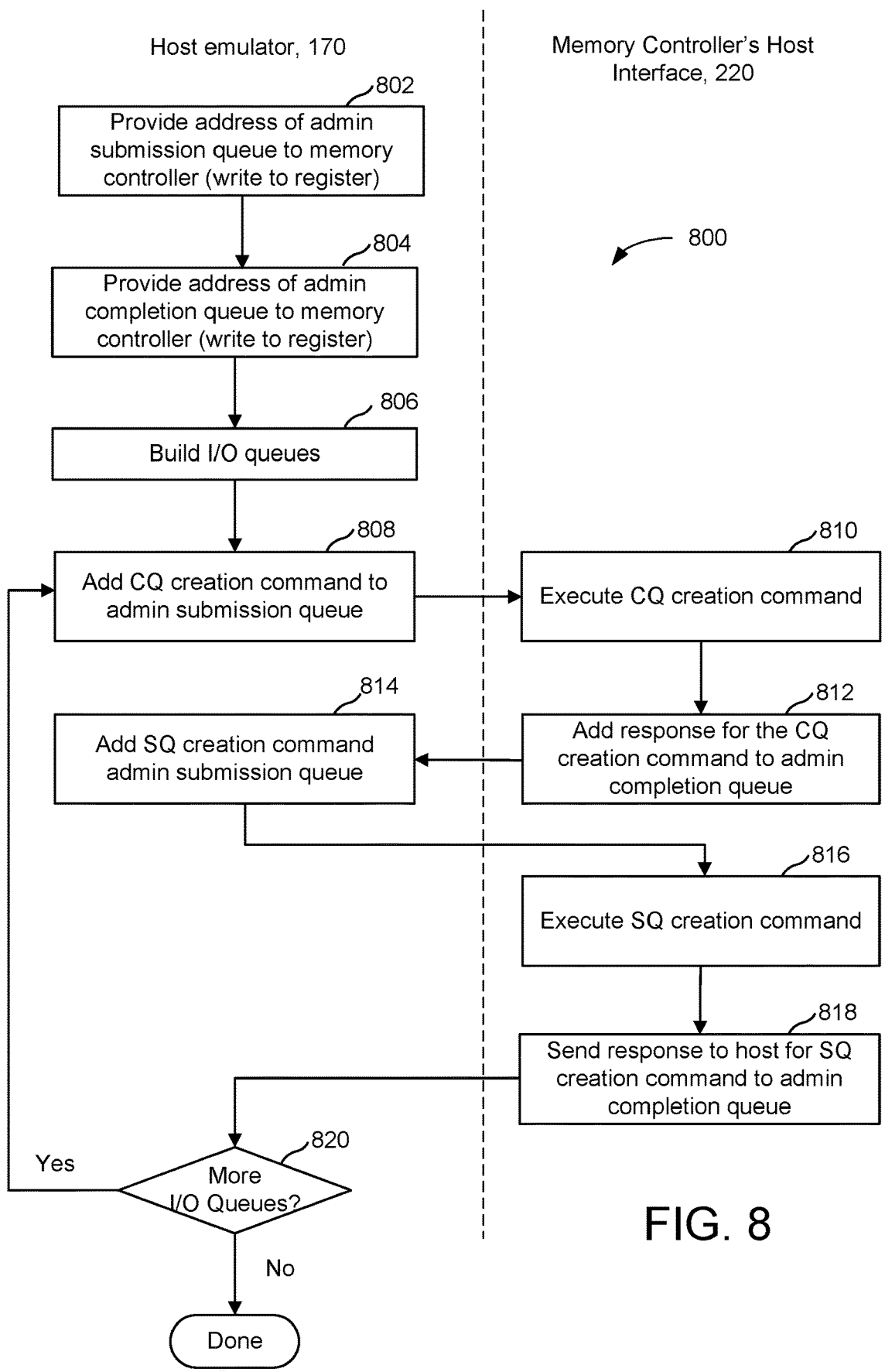
FIG. 8 is a flowchart of one embodiment of a process of creating I/O queues during initialization of host interface in memory controller.

FIG. 8 is a flowchart of one embodiment of a process 800 of creating I/O queues 162, 164 during initialization of host interface 220 in memory controller 122. Process 800 may be used during steps 702 and 704 of process 700. Process 800 is divided between actions performed by host emulator 170 and those performed by the host interface 220. Note that the host emulator 170 performs steps that might otherwise be performed by host controller 180. Process 800 can be modified for use with a host system 140, in the event that the host emulator 170 is not being used. This modification includes having the host system 140 perform actions of the host emulator 170.

Step 802 includes the host emulator 170 providing addresses of an admin submission queue 152 to the memory controller's host interface 220. In one embodiment, the host emulator 170 writes the address to one of the registers 252 in the memory system 100. The address of the admin submission queue 152 may be an address in storage 251 (e.g., RAM 122b or 304).

Step 804 includes the host emulator 170 providing addresses of an admin completion queue 154 to the memory controller's host interface 220. In one embodiment, the host emulator 170 writes the addresses to one of the registers 252 in the memory system 100. The address of the admin completion queue 154 may be an address in RAM 304. However, the admin completion queue 154 is not required to be located in RAM 304.

Figure 9:
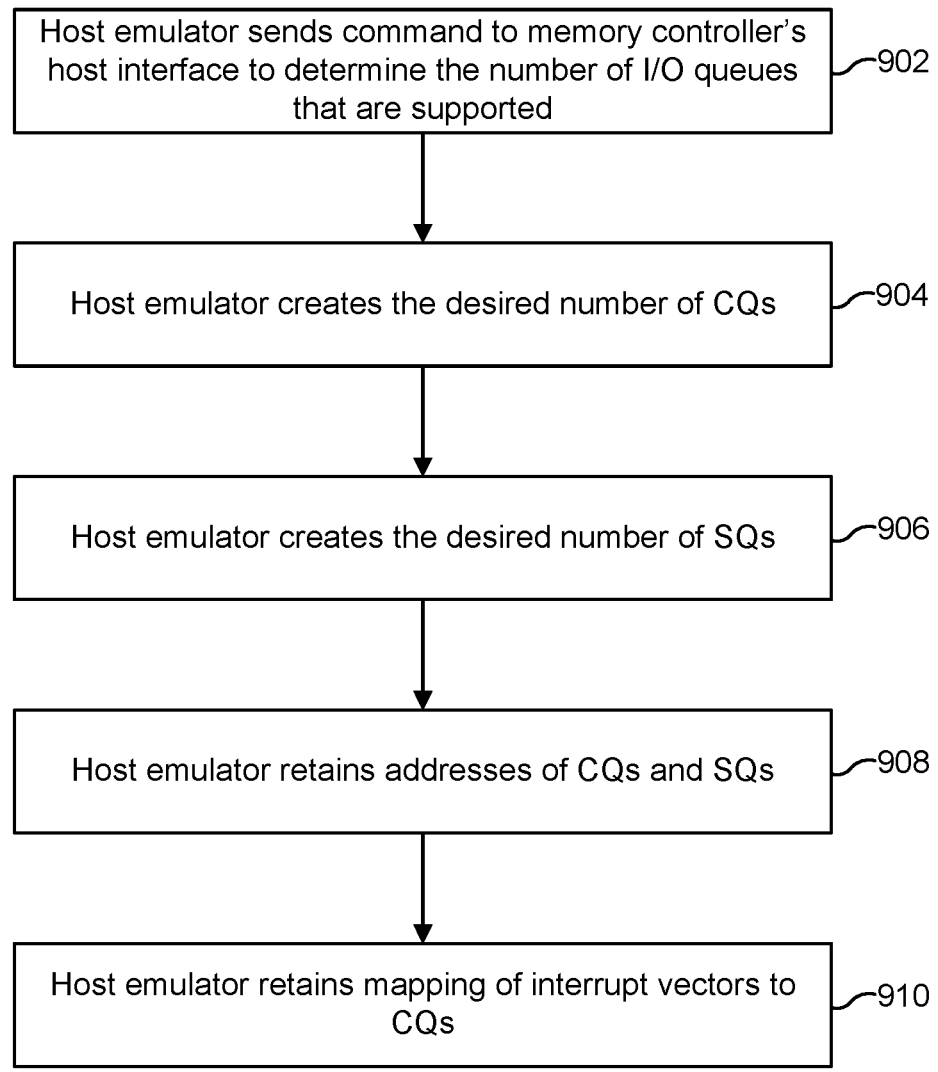
FIG. 9 is a flowchart of one embodiment of a process of one embodiment of a host emulator building I/O queues.

Step 806 includes the host emulator 170 building I/O queues 162, 164. Step 806 refers to the host emulator 170 allocating memory for the I/O queues 162, 164, and saving I/O queue metadata 258. Memory is allocated in RAM 304 for the I/O queues 162, 164, in one embodiment. FIG. 9 provides further details of one embodiment of the host emulator 170 building I/O queues 162, 164.

Step 808 includes the host emulator 170 providing a CQ creation command on the admin submission queue 152. The CQ creation command indicates that the host emulator 170 has allocated memory for a CQ 164. The CQ creation command also includes metadata for the CQ 164. Further details of one embodiment of step 808 are discussed in FIG. 10. In one embodiment, the CQ creation command is an NVMe create I/O completion queue command.

Step 810 includes the memory controller's host interface 220 executing the CQ creation command. In one embodiment, the memory controller's host interface 220 stores queue metadata 258 in storage 251 in step 810. The queue metadata 258 may include an identifier of the CQ 164, one or more addresses for the CQ, and an interrupt vector for the CQ. The interrupt vector specifies an interrupt vector to which the memory controller's host interface 220 is to write in response to placing one or more command responses on the CQ. This interrupt vector notifies the host emulator 170 that a command has been completed, in an embodiment. Further details of one embodiment of step 810 are discussed in FIG. 10.

Step 812 includes the memory controller's host interface 220 adding a response for the CQ creation command to the admin completion queue 154. The host emulator 170 then processes the response.

Step 814 includes the host emulator 170 providing an SQ creation command on the admin submission queue 152. The SQ creation command indicates that the host emulator 170 has allocated memory for an SQ 162. The SQ creation command also includes metadata for the SQ 162. Further details of one embodiment of step 808 are discussed in FIG. 11. In one embodiment, the SQ creation command is an NVMe create I/O submission queue command.

Step 816 includes the memory controller's host interface 220 executing the SQ creation command. In one embodiment, the memory controller's host interface 220 executing stores queue metadata 258 in storage 251 in step 816. The queue metadata 258 may include: an identifier of the SQ 162, one or more addresses for the SQ 162, and an identifier of a CQ 164 that is mapped to the SQ. Further details of one embodiment of step 810 are discussed in FIG. 11.

Step 818 includes the memory controller's host interface 220 adding a response for the CQ creation command to the admin completion queue 154. The host emulator 170 then processes the response.

Step 820 includes the host emulator 170 determining whether there are more I/O queues 162, 164 to build. If so, the process 800 returns to step 808.

FIG. 9 is a flowchart of one embodiment of a process 900 of one embodiment of a host emulator 170 building I/O queues 162, 164. The process 900 may be used during step 706 of process 700. Step 902 includes the host emulator 170 sending a command to the memory controller's host interface 220 to determine how many I/O queues are supported by the memory controller 122. The host emulator 170 may place the command on the admin submission queue 152. In one embodiment, the host emulator 170 sends an NVMe get features command.

Step 904 includes the host emulator 170 creating a desired number of CQs 164 in memory. Creating the CQ 164 includes allocating memory for the CQ. For example, the host emulator 170 could use a command such as "malloc," which is commonly used to perform dynamic memory allocations. Use of "malloc" is one example of memory allocation but is not required. Step 904 may also include initializing the contents of the memory to a default value, such as all zeroes. It is not required that a CQ 164 be contiguous in memory. Thus, a given CQ 164 might be formed from a number of "buffers." For example, a CQ 164 could be formed from a number of 4K buffer, which might or might not be contiguous in memory. In one embodiment, the host emulator 170 allocates a portion of the RAM 304 for the CQs 164. In one embodiment, the host emulator 170 allocates a portion of storage 251 for each of the CQs 164.

Step 906 includes the host emulator 170 creating a desired number of SQs 162 in memory. Step 906 may be similar to creating the desired number of CQs 164. Creating the SQs 162 includes allocating memory for the SQ. It is not required that an SQ 162 be contiguous in memory. In one embodiment, the host emulator 170 allocates a portion of storage 251 for each of the SQs 162.

Step 908 includes the host emulator 170 retaining addresses of the I/O queues 162, 164 in the I/O queue metadata 258. Step 908 may also include the host emulator 170 retaining a mapping from each of the SQs 162 to a corresponding CQ 164.

Step 910 includes the host emulator 170 retaining a mapping of interrupt vectors to SQs 164. Note that a given interrupt vector could be associated with more than one CQ 164. In one embodiment, the interrupt vectors are MSI (Message Signaled Interrupts). In one embodiment, the interrupt vectors are MSI-X.

Figure 10:
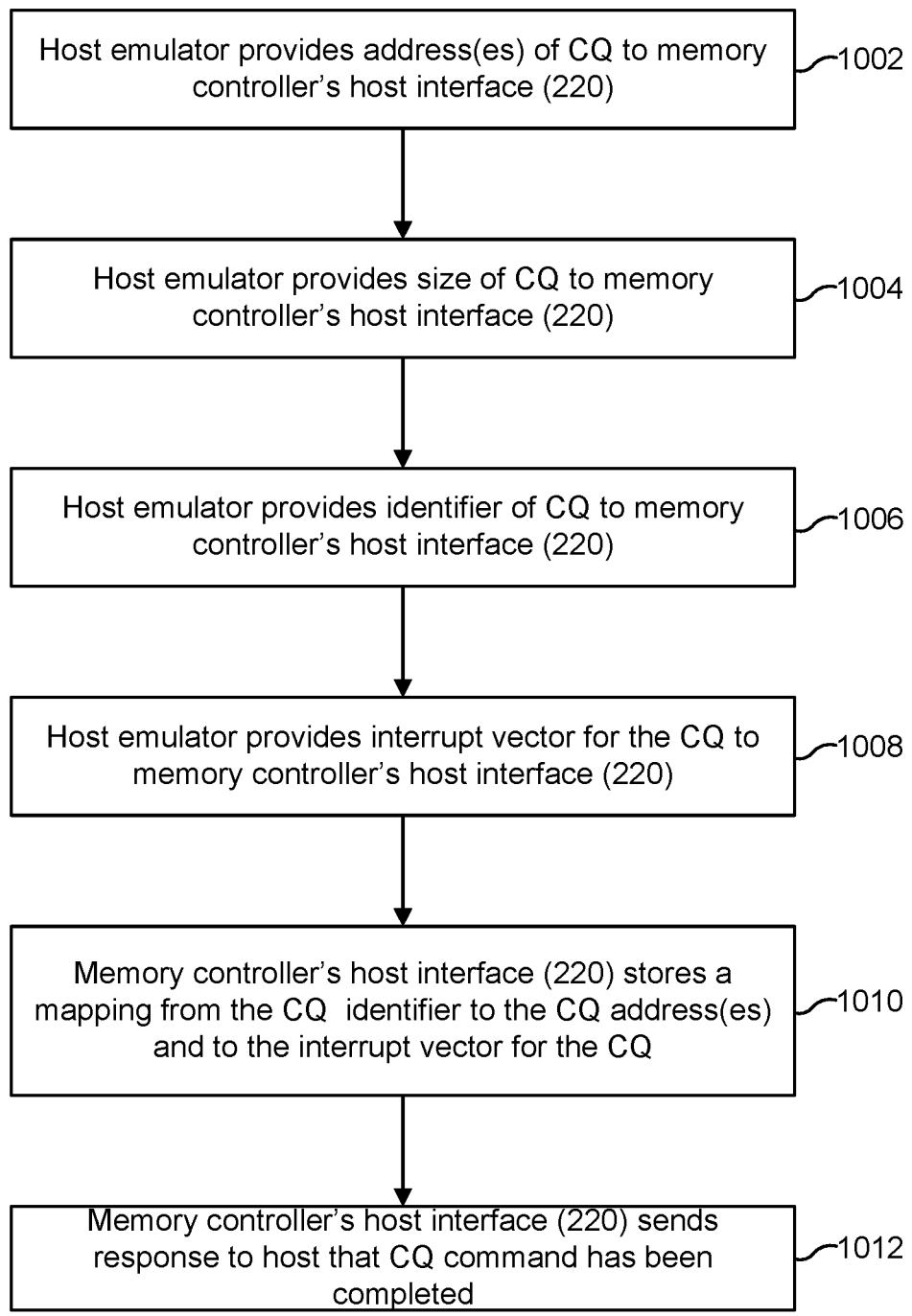
FIG. 10 is a flowchart of one embodiment of a process that includes a host emulator providing metadata for a command submission queue (SQ) to a memory controller.

FIG. 10 is a flowchart of one embodiment of a process 1000 that includes a host emulator 170 providing metadata for an SQ 164 to a memory controller host interface 220. The process 1000 may be used during one embodiment of steps 808-812 of process 800. Note that process 1000 describes processing for one CQ 164.

Step 1002 includes the host emulator 170 providing one or more addresses of a CQ 164 to a memory controller host interface 220. Step 1004 includes the host emulator 170 providing the size of the CQ 164 to the memory controller host interface 220. Step 1006 includes the host emulator 170 providing an identifier of the CQ 164 to the host interface 220. Step 1008 includes the host emulator 170 providing an interrupt vector for the CQ 164 to the host interface 220. Steps 1002-1008 are one embodiment of step 808. In one embodiment, the host emulator 170 provides an NVMe create I/O completion queue command to the admin submission queue 152 to implement steps 1002-1008.

Step 1010 includes the host interface 220 storing the metadata for the CQ 164 as queue metadata 258 in storage 251. Thus, the host interface 220 may store: 1) size of the CQ 164; 2) an identifier for the CQ 164; 3) one or more addresses of the CQ 164; and 4) an interrupt vector for the CQ 164. In one embodiment, the host interface 220 stores a copy of the metadata for the CQ 164 in non-volatile memory such that the metadata for the CQ 164 is preserved in the event power is lost. Step 1010 is one embodiment of step 810 of process 800.

Step 1012 includes the host interface 220 sending a response to the host emulator 170 that CQ command has been completed. In one embodiment, the host interface 220 puts a command response to the NVMe create I/O completion queue command onto the admin completion queue 154. Step 1012 is one embodiment of step 812 of process 800.

Figure 11:
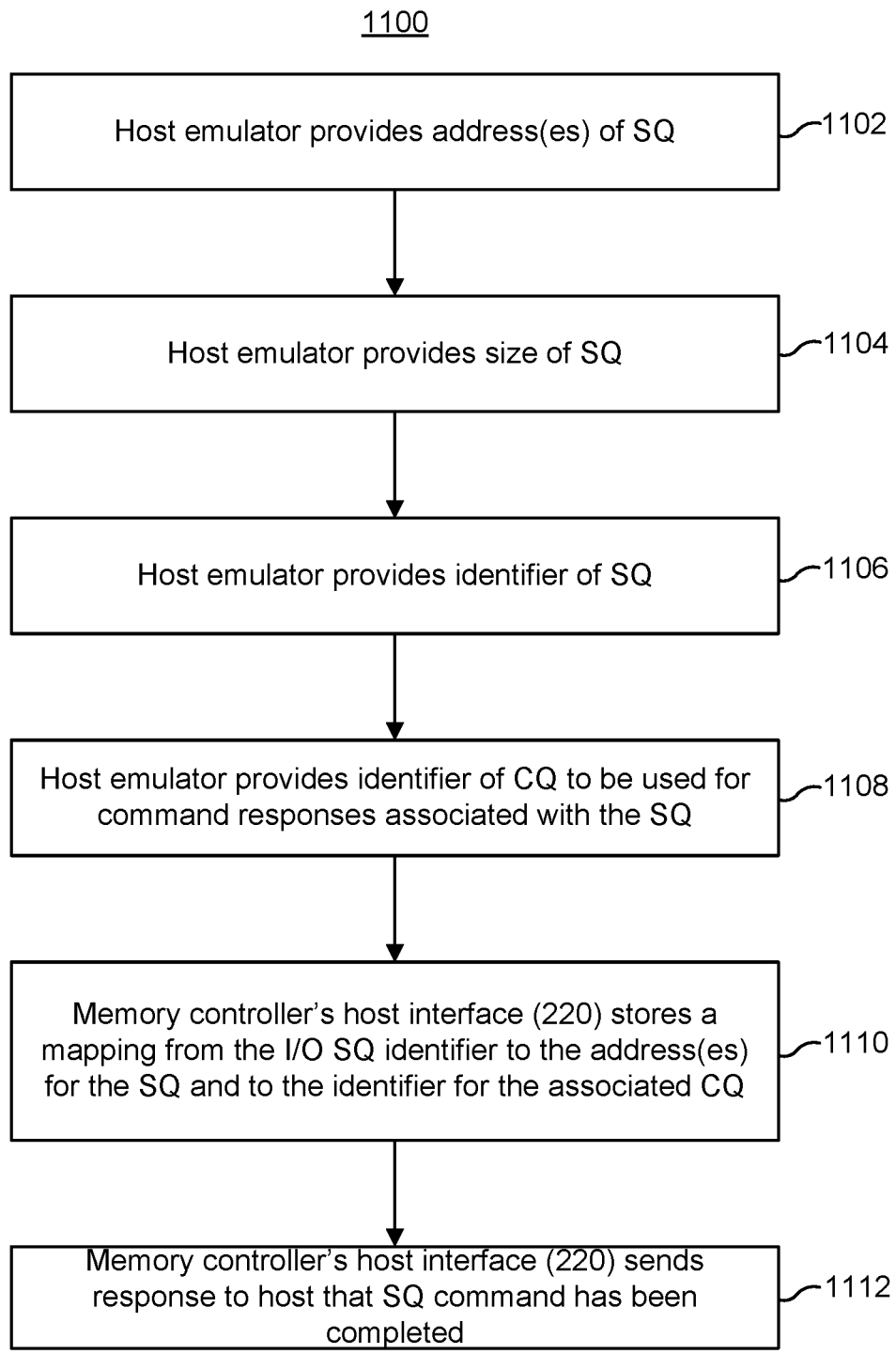
FIG. 11 is a flowchart of one embodiment of a process that includes a host emulator providing metadata for a command completion queue (CQ) to a memory controller.

FIG. 11 is a flowchart of one embodiment of a process 1100 that includes a host emulator 170 providing metadata for an SQ 162 to a host interface 220. The process 1100 may be used during one embodiment of steps 816-818 of process 800. Note that process 1100 describes processing for one SQ 162.

Step 1102 includes the host emulator 170 providing one or more addresses of an SQ 162 to a memory controller host interface 220. Step 1104 includes the host emulator 170 providing the size of the SQ 162 to the host interface 220. Step 1106 includes the host emulator 170 providing an identifier of the SQ 162 to the host interface 220. Step 1108 includes the host emulator 170 providing an identifier of a CQ 164 to be used for command completions associated with the SQ 162 to the host interface 220. Steps 1102-1108 are one embodiment of step 816. In one embodiment, the host emulator 170 provides an NVMe create I/O submission queue command to the admin submission queue 152 to implement steps 1102-1108.

Step 1110 includes the host interface 220 storing the metadata for the SQ 162 as queue metadata 258 in storage 251. Thus, the host interface 220 may store: 1) size of the SQ 162; 2) an identifier for the SQ 162; 3) one or more addresses of the SQ 162; and 4) an identifier of a CQ 164 to be used for command completions associated with the SQ 162. In one embodiment, the host interface 220 stores a copy of the metadata for the SQ 162 in non-volatile memory such that the metadata for the SQ 162 is preserved in the event power is lost. Step 1110 is one embodiment of step 816 of process 800.

Step 1112 includes the host interface 220 sending a response to the host emulator 170 that SQ command has been completed. In one embodiment, the host interface 220 puts a command response to the NVMe create I/O submission queue command onto the admin completion queue 154. Step 1112 is one embodiment of step 818 of process 900.

Figure 12:
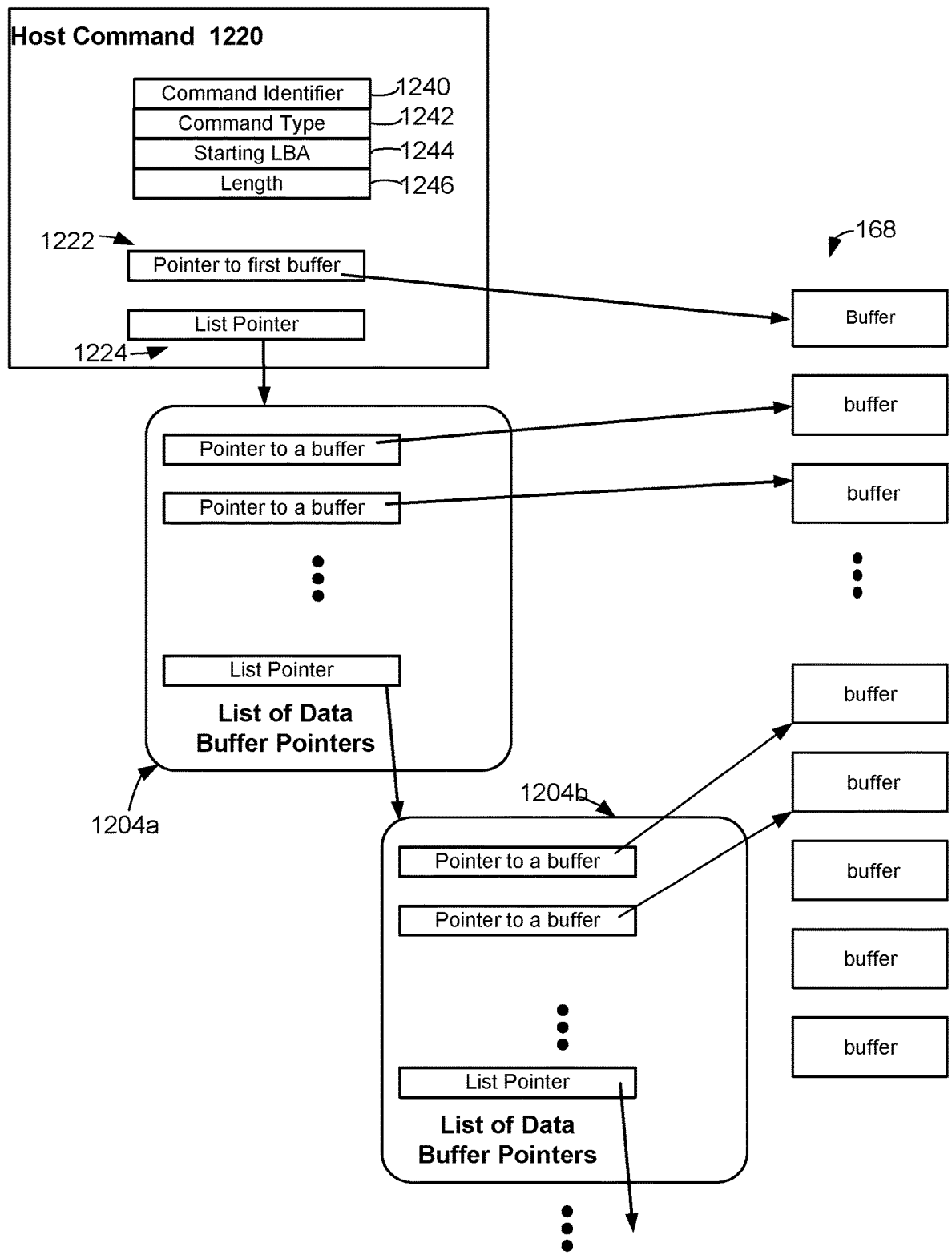
FIG. 12 is an example of a host command and data buffers.

FIG. 12 is a diagram of one example of a host command 1220, data buffer pointers 168, and lists 1204 of data buffer pointers. In one embodiment, each of the data buffer pointers is a physical page in memory. This could be host memory, if a host system is available. However, when the host emulator 170 is used, the data buffer pointers 168 may be implemented in storage 251 (e.g., RAM 304) on the memory system 100.

Also, each of the lists 1204 is a physical page, in one embodiment. The lists 1204 reside in data buffer pointers 166 in host memory 160, in one embodiment when the host system 140 is used. However, note that lists 1204 reside in the memory system 100 when the host emulator 170 is used. For example, with respect to the embodiment of FIG. 2B, lists 1204 could reside in data buffer pointers 166 in storage 251 that is coupled to the memory controller 122 over a physical communication link.

The host system 140 may place the host command 1220 on SQs 162 in host memory 160, in one embodiment when the host system 140 is available. The host emulator 170 may place the host command 1220 on SQs 162 in storage 251, in one embodiment. Note that the host command 1220 could be for a memory access operation, such as write (also referred to as "program") or read. The command identifier 1240 may be used to identify the command. In other words, the command identifier 1240 may distinguish one read command from another read command, etc. The host interface 220 may use this command identifier 1240 to provide status for the completed command on the completion queue (e.g., FIG. 2A, 164 or FIG. 2B, 164). The command type 1242 indicates the type of command (e.g., read, write, etc.). The starting LBA field 1244 indicates the starting logical block address (LBA) for a read or write. The length field 1246 is for the length of the read or write. The length could be specified as a number of logical blocks. Note that the memory controller 122 may convert the starting LBA, as well as other LBAs as indicated by the length of the read or write, to physical addresses in non-volatile memory die 108.

A host command 1220 includes field 1222 and field 1224. Field 1222 and field 1224 may contain data pointers. For example, field 1222 may point to a data buffer in data buffers 168. Field 1224, if used, may point to a list of data buffer pointers in storage 251, in one embodiment. The host command 1220 may have other fields as well. For example, various fields may be used for data management, such as whether the data is compressible, whether this command is part of a sequential request, latency requirements, etc.

Field 1222 contains a pointer to the first data buffer in storage 251, in this example. In some embodiments, field 1222 has an offset which may be zero or non-zero. The offset may be used to refine the starting location of the data buffer.

Field 1224 contains a pointer to a list of data buffer pointers 1204*a*, in this example. List 1204*a* contains a number of entries. All but the last entry contains a pointer to a data buffer in the host memory. Herein, a pointer to a data buffer in memory in storage 251 will be referred to as a "data buffer pointer." The last entry in list 1204*a* contains a pointer to list 1204*b*. List 1204*b* contains a number of entries. All but the last entry contains a pointer to a data buffer in storage 251. The last entry in list 1204*b* contains a pointer to another list 1204 (not depicted in FIG. 12A). Herein, the term "list pointer" may be used to refer to a pointer to a list that includes data buffer pointers. However, note that the list could also include entries that are not data buffer pointers, such as a pointer to another list. Note that the least entry is not always a pointer to another list 1204. The last entry may simply be a pointer to a data buffer pointer.

In one embodiment, field 1224 is a pointer to a list of NVMe PRPs. Thus, in one embodiment, lists 1204 are PRP lists. As one example, a PRP list could have 512 PRP entries. For example, the PRP list could be 4 KB in size, with 512 PRP entries that are each 64 bits. However, there may be more or fewer PRP entries in a PRP list 1204. Also, the PRP list 1204 could be larger or smaller than 4 KB. For example, an 8 KB PRP list 1204 might contain 1024 entries that are each 64 bits. In one embodiment, the PRP list 1204 has a size equal to one single page of contiguous memory in the host memory.

Note that the host command 1220 may be associated with more than one list 1204 of data buffer pointers. The total number of data buffer pointers that are needed for a command may be implied by the command parameters and the physical memory page size. The last entry in the list 1204 may either be a pointer to a data buffer or a pointer to the next list. In the event that the last entry is a pointer to the next list, that entry points to a host memory address that contains the next list 1204. Note that the next list 1204 may comprise one physical memory page.

In one embodiment, the memory controller 122 is able to determine the location of the last entry in a given list 1204 based on the size of one physical memory page. The memory controller 122 is able to determine whether the last entry is a pointer to another list 1204 or is a data buffer pointer based on whether more data buffer pointers are needed to satisfy the read or write command, in one embodiment.

There could be a large number of lists 1204. For example, a command might be to read 256 MB in the non-volatile storage system. If each data buffer is 4 KB, this might require about 64,000 data buffers—and hence 64,000 list entries. With each list entry being 64 bits, this means that the data buffer pointers could use about 512 KB of storage.

Note that for some read or write commands, field 1224 is not used. For example, if a read is for just a one data buffer, then just field 1222 might be used. Also, in some cases, there might be just one list 1204. Again, this may be the case if there is a relatively small amount of data to be read or written. However, when there are multiple lists, it becomes much more difficult for the memory controller 122 to efficiently manage access of the data buffer pointers from, for example, host memory.

Figure 13:
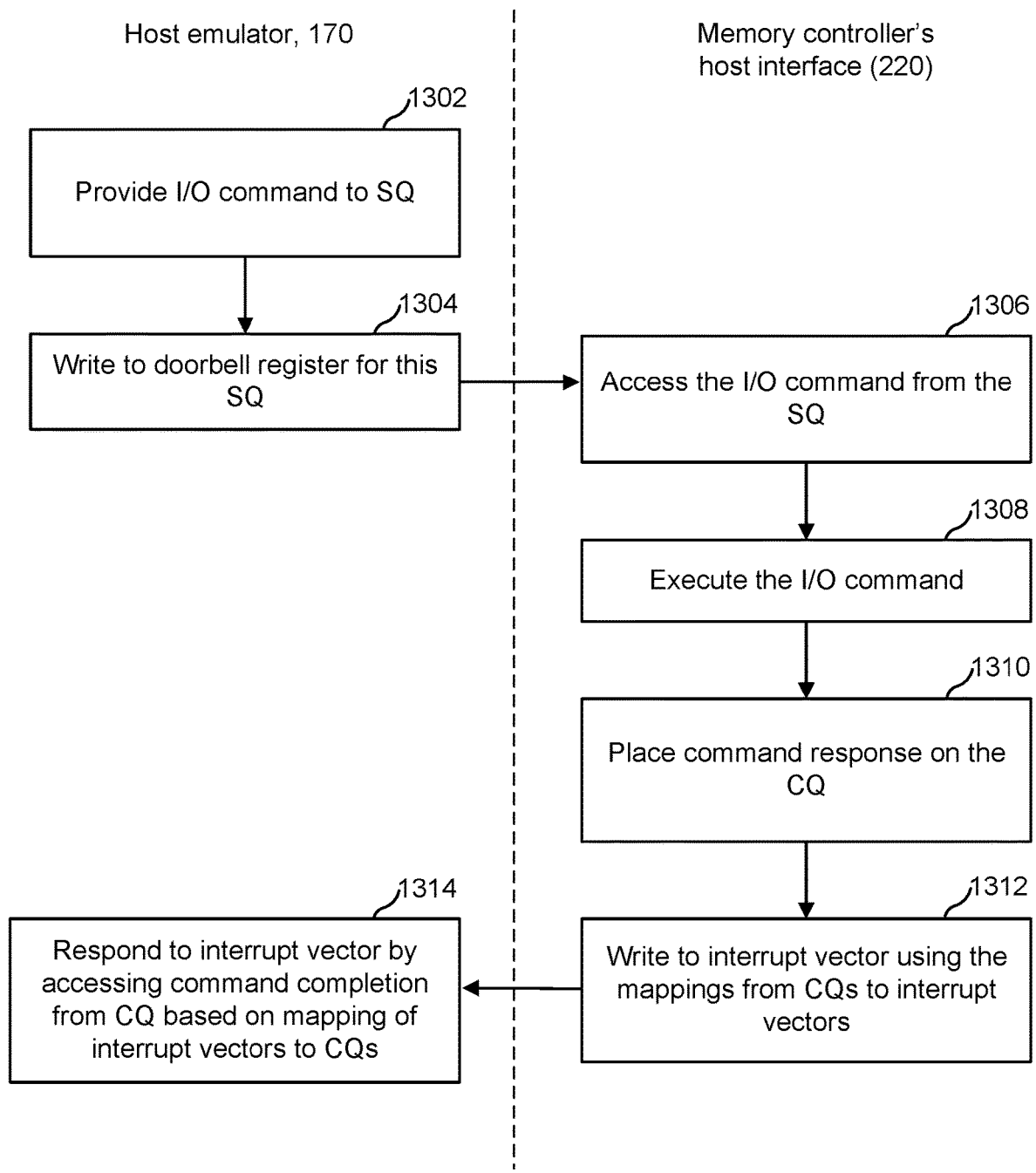
FIG. 13 is a flowchart of one embodiment of a process of a host emulator and memory controller host interface using I/O queues.

FIG. 13 is a flowchart of one embodiment of a process 1300 of a host emulator 170 and host interface 220 using I/O queues 162, 164 to process memory access requests. Process 1300 describes processing one I/O command. The SQ 162 and CQ 164 may be in storage 251 (e.g., RAM 304) when the host emulator 170 is used.

Step 1302 includes the host emulator 170 providing an I/O command to an SQ 162. This might be a read or write of memory cells in memory structure 126, for example. The host emulator 170 may also use a tail pointer for this SQ 162 to know which slot to place the I/O command.

Step 1304 includes the host emulator 170 writing to a doorbell register for this SQ 162. The host emulator 170 places information in the doorbell register that corresponds to the slot on the SQ 162 into which the I/O command was placed, in one embodiment. In one embodiment, the host places a tail pointer in the doorbell register. The tail pointer is an index that specifies a slot (or entry) of the SQ 162, in one embodiment. Note that there may be a unique doorbell register for each SQ 162, such that the doorbell register itself may serve to identify the queue number. However, the host interface 220 may need to rely on the persisted address of the SQ 162 to be able to locate the SQ 162 in memory. In one embodiment, the host writes to an NVMe submission queue tail doorbell register to provide the new tail pointer for this CQ 162.

Step 1306 includes the memory controller host interface 220 accessing the I/O command from the SQ 162. The host interface 220 may also use a tail pointer for the SQ 162. As noted, the tail pointer may be in the doorbell register.

Note that in some cases, the host places more than one I/O command on the SQ 162. In this case, the host interface 220 may determine how many I/O commands were placed on the SQ 162 by comparing the present value of the tail pointer with a previous value of the tail pointer.

Step 1308 includes the host interface 220 executing the I/O command. For example, the host interface 220 reads from or writes to non-volatile memory in structure 126. Step 1308 may include a data transfer between RAM 304 and the memory structure 126.

Step 1310 includes the host interface 220 placing a response to the I/O command on the CQ 164 that is mapped to the SQ 162. The host interface 220 may also use the address of the SQ 164. Moreover, the host interface 220 may maintain a tail pointer for the SQ 164 to know which slot on the CQ 164 to use for the command response.

Step 1312 includes the host interface 220 writing to an interrupt vector to notify the host emulator 170 about the command response. The host interface 220 uses the mappings to determine the correct interrupt vector. The interrupt vector may be an MSI or MSI-X, for example.

Step 1314 includes the host emulator 170 responding to the interrupt vector by accessing the command completion from the CQ 164. The host emulator 170 uses the mappings from interrupt vectors to SQs 164. The host emulator 170 may write to a doorbell register after it processes the response. In one embodiment, the host emulator 170 writes to an NVMe completion queue head doorbell register to provide the new header pointer for this SQ 164.

Technology disclosed herein assists while debugging failures on FPGA and silicon. Technology disclosed herein saves debug time and resources by completely isolating the Host system 140 from the device under test. During ramp-up time, issues arise with Hosts, PHY and MAC and embodiments of host emulators provide the capability of stressing all other components of storage devices while bypassing Host-interface components solely. Performance results of all internal components may be measured very early and even before ramping up Host interface, which may require expensive equipment that supports extremely high performance interfaces such as PCIe Gen5.

A first embodiment includes a non-volatile memory device comprising a host connection configured to control data transfer with a host system, a memory structure comprising non-volatile memory cells; and one or more control circuits in communication with the memory structure and the host connection. The one or more control circuits are configured to receive first memory access requests from the host system on the host connection while the non-volatile memory device is in a first mode. The first memory access requests to allow the host system to access the non-volatile memory cells in accordance with a memory access protocol. The one or more control circuits are configured to initiate second memory access requests internally in accordance with the memory access protocol while the non-volatile memory device is in a second mode. The one or more control circuits are configured to implement a memory controller side of the memory access protocol to respond to the first memory access requests while the non-volatile memory device is in the first mode and to respond to the second memory access requests while the non-volatile memory device is in the second mode.

In a second embodiment, in furtherance to the first embodiment, the one or more control circuits are further configured to instruct the memory controller side of the memory access protocol to provide command completion notices to the second memory access requests to a location inside of the non-volatile memory device.

In a third embodiment, in furtherance to the first or second embodiments, the one or more control circuits are further configured to process the command completion notices to the second memory access requests internally.

In a fourth embodiment, in furtherance to any of the first to third embodiments, the host connection comprises non-transitory storage and is configured to control data transfer with the host system at the physical level using the non-transitory storage while in the first mode. The one or more control circuits are further configured to use the non-transitory storage to store the second memory access requests when in the second mode.

In a fifth embodiment, in furtherance to any of the first to fourth embodiments, the host connection comprises non-transitory storage and is configured to control data transfer with the host system at the physical level using the non-transitory storage while in the first mode. The one or more control circuits are further configured to use the non-transitory storage to store data associated with the second memory access requests when in the second mode.

In a sixth embodiment, in furtherance to any of the first to fifth embodiments, the one or more control circuits further comprise a data generator configured to generate data for the second memory access requests.

In a seventh embodiment, in furtherance to any of the first to sixth embodiments, the one or more control circuits are further configured to issue the second memory access requests over the host connection to test a memory device external to the non-volatile memory device while in the second mode.

In an eighth embodiment, in furtherance to any of the first to seventh embodiments, the one or more control circuits are further configured to emulate a host side of the memory access protocol while the non-volatile memory device is the second mode, including issue the second memory access requests in accordance with the memory access protocol.

In a ninth embodiment, in furtherance to any of the first to eighth embodiments, the memory access protocol comprises one or more of Non-Volatile Memory Express (NVMe), Advanced Host Computer Interface (AHCI), Serial Advanced Technology Attachment (SATA), MultiMediaCard (MMC), eMMC, Universal Serial Bus (USB), Serial Attached Small Computer Systems Interface SCSI, Fibre Channel Protocol (FCP), and Universal Flash Storage (UFS).

One embodiment includes a method of operating a non-volatile storage device, the method comprises receiving first memory access requests from external to the non-volatile storage device while in a first mode of the non-volatile storage device. The first memory access requests are compliant with a memory access protocol that enables access to non-volatile memory in the non-volatile storage device from a host system external to the non-volatile storage device. The method further includes responding to the first memory access requests by a memory controller within the non-volatile storage device while in the first mode, including transferring data between the non-volatile memory and non-transitory storage in the host system. The method further comprises initiating second memory access requests from within the non-volatile storage device while in a second mode of the non-volatile storage device. The second memory access requests are compliant with the memory access protocol. The method further includes responding to the second memory access requests by the memory controller while in the second mode, including responding without transferring any data between the non-volatile memory and non-transitory storage external to the non-volatile storage device.

One embodiment includes a non-volatile memory device comprising non-volatile memory cells and a non-volatile memory controller. The non-volatile memory controller comprises a host connection configured to communicate with an external host controller at a physical level and at a link level. The non-volatile memory controller further comprises a host interface configured to communicate with the external host controller at a logical level via the host connection to control external access to the non-volatile memory cells while the non-volatile memory controller is in a functional mode. The non-volatile memory controller further comprises a host emulator configured to emulate the external host controller while the non-volatile memory controller is in a host emulator mode, the host emulator configured to issue memory access commands internally to the host interface.

Corresponding methods, systems and computer- or processor-readable storage devices which have executable code for performing the methods provided herein may also be provided.

For the purpose of this document, the numeric terms first (i.e., $1^{st}$) and second (i.e., $2^{nd}$) may be used to generally specify an order of when commands (e.g., write commands) are received by a memory controller from a host, as well as to generally specify an order in which data (e.g., $1^{st}$ and $2^{nd}$ data) is to be stored in non-volatile memory. However, it is noted that the term first (i.e., $1^{st}$) should not be interpreted as implying that nothing else precedes it.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the terms "based on" and "in dependence on" may be read as "based at least in part on."

For purposes of this document, a "set" may include one or more elements.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claim is:

1. A non-volatile memory device comprising:
a host connection configured to control data transfer with a host system;
a memory structure comprising non-volatile memory cells; and
one or more control circuits in communication with the memory structure and the host connection, the one or more control circuits configured to:
receive first memory access requests from the host system on the host connection while the non-volatile memory device is in a first mode, the first memory access requests to allow the host system to access the non-volatile memory cells in accordance with a memory access protocol;
initiate second memory access requests internally in accordance with the memory access protocol while the non-volatile memory device is in a second mode; and
implement a memory controller side of the memory access protocol to respond to the first memory access requests while the non-volatile memory device is in the first mode and to respond to the second memory access requests while the non-volatile memory device is in the second mode; and
process command completion notices for the second memory access requests internally while the non-volatile memory device is in the second mode.

2. The non-volatile memory device of claim 1, wherein the one or more control circuits are further configured to:
instruct the memory controller side of the memory access protocol to provide the command completion notices to the second memory access requests to a location inside of the non-volatile memory device.

3. The non-volatile memory device of claim 1 wherein:
the host connection comprises non-transitory storage and is configured to control data transfer with the host system at a physical level using the non-transitory storage while in the first mode; and
the one or more control circuits are further configured to use the non-transitory storage to store the second memory access requests when in the second mode.

4. The non-volatile memory device of claim 1 wherein:
the host connection comprises non-transitory storage and is configured to control data transfer with the host system at a physical level using the non-transitory storage while in the first mode; and
the one or more control circuits are further configured to use the non-transitory storage to store data associated with the second memory access requests when in the second mode.

5. The non-volatile memory device of claim 1, wherein the one or more control circuits further comprise:
a data generator configured to generate data for the second memory access requests.

6. The non-volatile memory device of claim 1, wherein the one or more control circuits are further configured to:
issue the second memory access requests over the host connection to test a memory device external to the non-volatile memory device while in the second mode.

7. The non-volatile memory device of claim 1, wherein the one or more control circuits are further configured to:
emulate a host side of the memory access protocol while the non-volatile memory device is the second mode, including issue the second memory access requests in accordance with the memory access protocol.

8. The non-volatile memory device of claim 1, wherein the memory access protocol comprises one or more of Non-Volatile Memory Express (NVMe), Advanced Host Computer Interface (AHCI), Serial Advanced Technology Attachment (SATA), MultiMediaCard (MMC), eMMC, Universal Serial Bus (USB), Serial Attached Small Computer Systems Interface SCSI, Fibre Channel Protocol (FCP), and Universal Flash Storage (UFS).

9. A method of operating a non-volatile storage device, the method comprising:
receiving first memory access requests from external to the non-volatile storage device while in a first mode of the non-volatile storage device, the first memory access requests compliant with a memory access protocol that enables access to non-volatile memory in the non-volatile storage device from a host system external to the non-volatile storage device;
responding to the first memory access requests by a memory controller within the non-volatile storage device while in the first mode, including transferring data between the non-volatile memory and non-transitory storage in the host system;
initiating second memory access requests from within the non-volatile storage device while in a second mode of the non-volatile storage device, the second memory access requests compliant with the memory access protocol, including adding the second memory access requests to one or more command submission queues within the non-volatile storage device; and
responding to the second memory access requests by the memory controller while in the second mode.

10. The method of claim 9, wherein responding to the second memory access requests by the memory controller while in the second mode comprises:
transferring data between the non-volatile memory and non-transitory storage within the non-volatile storage device to satisfy the second memory access requests without transferring any data between the non-volatile memory and non-transitory storage external to the non-volatile storage device.

11. The method of claim 9, wherein responding to the second memory access requests by the memory controller while in the second mode comprises:
generating data within the non-volatile storage device; and
storing the generated data in the non-volatile memory.

12. The method of claim 9, wherein responding to the second memory access requests by the memory controller while in the second mode further comprises:
adding command status to the second memory access requests to one or more command completion queues within the non-volatile storage device.

13. A non-volatile memory device comprising:
non-volatile memory cells; and
a non-volatile memory controller comprising:
a host connection configured to communicate with an external host controller at a physical level and at a link level;
a host interface configured to communicate with the external host controller at a logical level via the host connection to control external access to the non-volatile memory cells while the non-volatile memory controller is in a functional mode;
means for emulating the external host controller while the non-volatile memory controller is in a host emulator mode; and
means for issuing memory access commands internally to the host interface.

14. The non-volatile memory device of claim 13, wherein:
the means for emulating the external host controller is configured to instruct the host interface to communicate with the means for emulating the external host controller when in the host emulator mode.

15. The non-volatile memory device of claim 13, wherein:
the host connection comprises non-transitory storage;
the host connection is configured to use the non-transitory storage for control of data transfer with the external host controller while in the functional mode; and
the means for emulating the external host controller is further configured to use the non-transitory storage to store the memory access commands while in the host emulator mode.

16. The non-volatile memory device of claim 13, wherein:
the means for emulating the external host controller is further configured to issue memory access commands externally over the host connection while in the host emulator mode to test a host connection in another non-volatile memory device.

17. The non-volatile memory device of claim 13, wherein the non-volatile memory controller further comprises:
a data generator configured to generate data for memory access requests while in the host emulator mode.

18. The non-volatile memory device of claim 13, wherein the means for emulating the external host controller is further configured to:
initialize the host interface in response to the non-volatile memory controller being configured to be in the host emulator mode.

\* \* \* \* \*